United States Patent
Chen et al.

(10) Patent No.: US 9,875,357 B2
(45) Date of Patent: Jan. 23, 2018

(54) METHODS AND SYSTEMS FOR DETECTING FAKE USER INTERACTIONS WITH A MOBILE DEVICE FOR IMPROVED MALWARE PROTECTION

(71) Applicant: QUALCOMM Incorporated, San Diego, CA (US)

(72) Inventors: Yin Chen, Campbell, CA (US); Man Ki Yoon, Urbana, IL (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 14/616,046

(22) Filed: Feb. 6, 2015

(65) Prior Publication Data

US 2016/0232352 A1    Aug. 11, 2016

(51) Int. Cl.
| | | |
|---|---|---|
| G06F 21/00 | (2013.01) | |
| G06F 12/14 | (2006.01) | |
| G06F 21/56 | (2013.01) | |
| H04L 29/06 | (2006.01) | |
| G06F 21/31 | (2013.01) | |

(52) U.S. Cl.
CPC .......... *G06F 21/566* (2013.01); *G06F 21/316* (2013.01); *G06F 2221/2133* (2013.01)

(58) Field of Classification Search
CPC .............................. G06F 21/56; G06N 99/005
USPC ...................... 726/22–24; 706/12, 20, 45, 46
See application file for complete search history.

(56) References Cited

U.S. PATENT DOCUMENTS

| 8,763,127 B2 | 6/2014 | Yao et al. |
| 8,776,227 B1 | 7/2014 | Glick et al. |
| 8,856,542 B2 | 10/2014 | Tatarinov et al. |

(Continued)

FOREIGN PATENT DOCUMENTS

| WO | 2007146437 A2 | 12/2007 |
| WO | 2010105249 A1 | 9/2010 |

OTHER PUBLICATIONS

Abhijit Bose, Xin Hu, Kang G. Shin, and Taejoon Park. 2008. Behavioral detection of malware on mobile handsets. In Proceedings of the 6th international conference on Mobile systems, applications, and services (MobiSys '08). ACM, New York, NY, USA, 225-238. (Year: 2008).*

(Continued)

*Primary Examiner* — Alexander Lagor
(74) *Attorney, Agent, or Firm* — The Marbury Law Group

(57) ABSTRACT

A computing device processor may be configured with processor-executable instructions to implement methods of detecting and responding to fake user interaction (UI) events. The processor may determine whether a user interaction event is a fake user interaction event by analyzing raw data generated by one or more hardware drivers in conjunction with user interaction event information generated or received by the high-level operating system. In addition, the processor may be configured with processor-executable instructions to implement methods of using behavioral analysis and machine learning techniques to identify, prevent, correct, or otherwise respond to malicious or performance-degrading behaviors of the computing device based on whether a detected user interaction event is an authentic or fake user interaction event.

28 Claims, 10 Drawing Sheets

(56) References Cited

U.S. PATENT DOCUMENTS

| | | |
|---|---|---|
| 2009/0199296 A1* | 8/2009 | Xie ................. G06F 21/316 |
| | | 726/23 |
| 2013/0247187 A1* | 9/2013 | Hsiao ............... G06F 21/552 |
| | | 726/22 |
| 2013/0304677 A1 | 11/2013 | Gupta et al. |
| 2014/0150100 A1 | 5/2014 | Gupta et al. |
| 2014/0199664 A1 | 7/2014 | Sadeh-Koniecpol et al. |
| 2016/0203415 A1* | 7/2016 | Chaiyochlarb ...... G06N 99/005 |
| | | 706/11 |

OTHER PUBLICATIONS

B. Amos, H. Turner and J. White, "Applying machine learning classifiers to dynamic Android malware detection at scale," 2013 9th International Wireless Communications and Mobile Computing Conference (IWCMC), Sardinia, 2013, pp. 1666-1671. (Year: 2013).*

International Search Report and Written Opinion—PCT/US2016/012851—ISA/EPO—dated Mar. 21, 2016.

Xie L., et al., "pBMDS: A Behaviour-based Malware Detection System for Cellphone Devices," Wisec '10, Mar. 22-24, 2010, Hoboken, New Jersey, pp. 37-48.

* cited by examiner

METHODS AND SYSTEMS FOR DETECTING FAKE USER INTERACTIONS WITH A MOBILE DEVICE FOR IMPROVED MALWARE PROTECTION

BACKGROUND

Cellular and wireless communication technologies have seen explosive growth over the past several years. Wireless service providers now offer a wide array of features and services that provide their users with unprecedented levels of access to information, resources and communications. To keep pace with these enhancements, personal and consumer electronic devices (e.g., cellular phones, watches, headphones, remote controls, etc.) have become more powerful and complex than ever, and now commonly include powerful processors, large memories, and other resources that allow for executing complex and powerful software applications on their devices.

Due to these and other improvements, personal and consumer electronic devices are becoming ubiquitous in modern life, and have unprecedented levels of access to information that is generated by, or which relates to, their users. In addition, people frequently use their devices to store sensitive information (e.g., credit card information, contacts, etc.) and/or to accomplish tasks for which security is important. For example, mobile device users frequently use their devices to purchase goods, send and receive sensitive communications, pay bills, manage bank accounts, and conduct other sensitive transactions. Due to these trends, personal and consumer electronic devices are quickly becoming the next frontier for malware and cyber attacks. Accordingly, new and improved security solutions that better protect resource-constrained computing devices, such as mobile and wireless devices, will be beneficial to consumers.

SUMMARY

The various embodiments include a method of analyzing an activity of a software application operating on a computing device, including comparing raw data received from a user input device of the computing device to user interaction event information received in the computing device to generate analysis results, and using the generated analysis results to determine whether a user interaction (UI) event correlates with a user of the computing device. In a further embodiment, the raw data received from the user input device may include raw data received from a device driver, and the user interaction event information received in the computing device may include interaction information received from a high level operating system of the computing device.

In a further embodiment, the method may include classifying the activity of the software application as non-benign in response to determining that the user interaction event does not correlate with a user of the computing device. In a further embodiment, the method may include generating a behavior vector that characterizes the activity of the software application, applying the generated behavior vector to a classifier model that may include a decision node that evaluates whether there is a user interaction event that corresponds to the activity in response to determining that the user interaction event does not correlate with a user of the computing device, and using a result of applying the generated behavior vector to the classifier model to determine whether the activity of the software application is non-benign.

In a further embodiment, the method may include generating a behavior vector that characterizes the activity of the software application, selecting a classifier model that does not include a decision node that tests whether there is a user interaction event that corresponds to the activity in response to determining that the user interaction event does not correlate with a user of the computing device, applying the generated behavior vector to the selected classifier model to generate additional analysis results, and using the generated additional analysis results to determine whether the activity of the software application is non-benign.

In a further embodiment, the method may include selecting a family of robust classifier models in response to determining that the user interaction event does not correlate with a user of the computing device, and applying a plurality of behavior vectors to the selected family of robust classifier models to determine whether the activity of the software application is non-benign. In a further embodiment, the method may include comparing raw data received from a first sensor of the computing device to raw data received from a second sensor of the computing device to determine whether the raw data received from the first sensor is consistent with the raw data received from the second sensor, in which comparing raw data received from the user input device of the computing device to the user interaction event information received in the computing device to generate analysis results is preformed in response to determining that the raw data received from the first sensor is consistent with the raw data received from the second sensor.

In a further embodiment, comparing raw data received from the first sensor to the raw data received from the second sensor may include comparing results of applying behavior vectors to classifier models. In a further embodiment, the raw data received from the user input device may include raw data received from a user input sensor, the user interaction event information received in the computing device may include data received from a device driver for the user input sensor, and using the generated analysis results to determine whether the user interaction event correlates with a user of the computing device may include determining that the user interaction event does not correlate with a user of the computing device in response to the raw data received from the user input sensor does not correlate to data received from the device driver for the user input sensor.

In a further embodiment, the user input sensor may include a touch screen, and the device driver may include a touch screen device driver. In a further embodiment, the method may include classifying the activity of the software application as non-benign in response to determining that the user interaction event does not correlate with a user of the computing device. In a further embodiment, the method may include generating a behavior vector that characterizes the activity of the software application, applying the generated behavior vector to a classifier model that does not include a decision node that evaluates conditions related to user interactions with the computing device in response to determining that the user interaction event does not correlate with a user of the computing device, and using a result of applying the generated behavior vector to the classifier model to determine whether the activity of the software application is non-benign.

Further embodiments may include a computing device having a processor configured with processor-executable instructions to perform various operations corresponding to the methods discussed above.

Further embodiments may include a computing device having various means for performing functions corresponding to the method operations discussed above.

Further embodiments may include a non-transitory processor-readable storage medium having stored thereon processor-executable instructions configured to cause a processor to perform various operations corresponding to the method operations discussed above

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
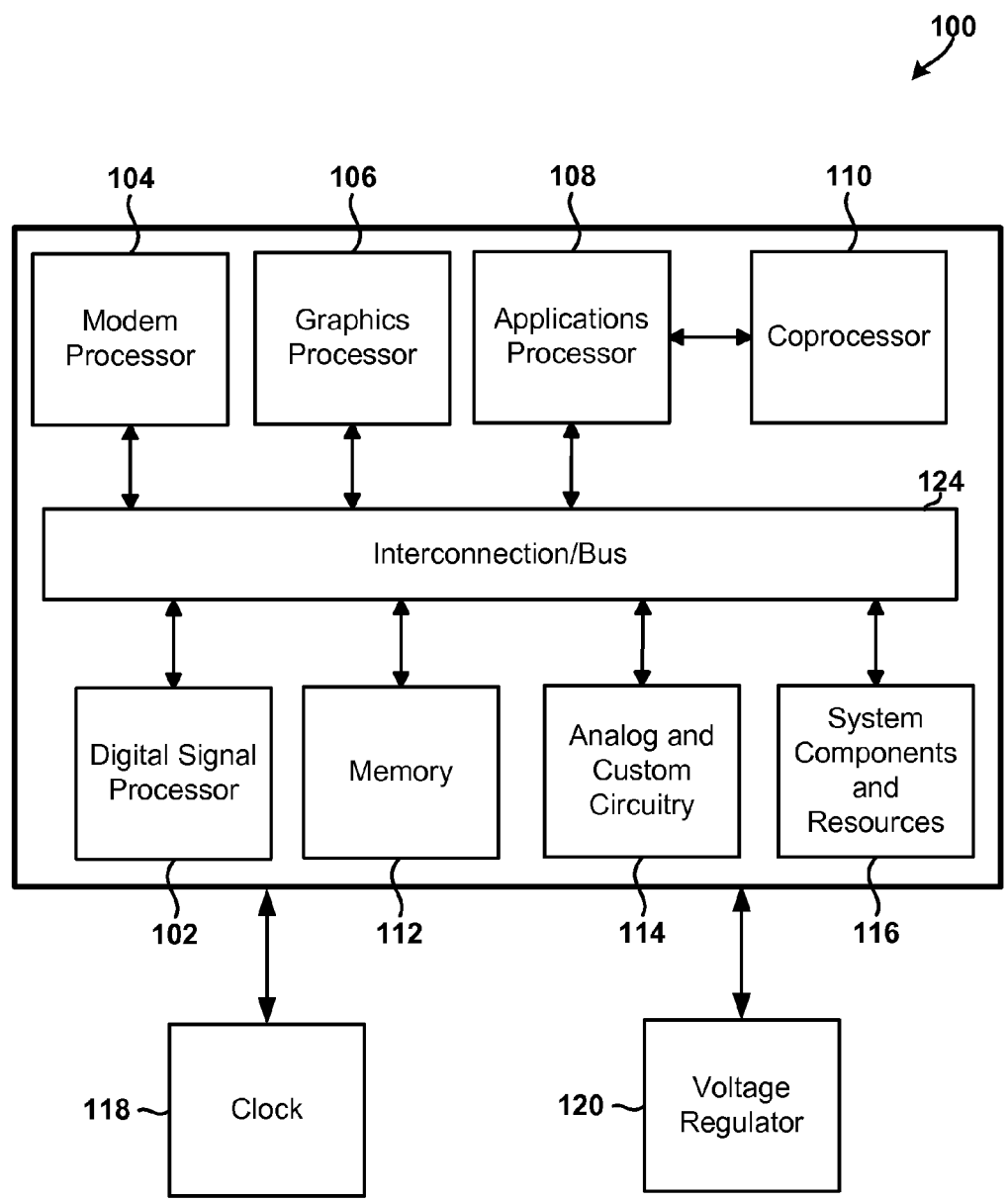
FIG. 1 is an architectural diagram of an example system on chip suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing devices configured to implement the methods, of using behavior-based and machine learning techniques to detect and respond to fake user interaction (UI) events. In an embodiment, a computing device may be configured to implement a method of analyzing raw data generated by one or more hardware drivers or user input devices in conjunction with UI event information generated or received by the high-level operating system, and use the results of this analysis to determine whether a UI event correlates with a user of the computing device and/or to classify a detected UI event as an authentic UI event or as a fake UI event. The computing device may also include a comprehensive behavior-based security system that is configured to identify and respond to non-benign device behaviors (e.g., behaviors caused by malicious or performance-degrading software applications, etc.) based on whether the UI event is an authentic or fake UI event.

Generally, each software application program performs a number of tasks or activities on the computing device. Some of application tasks/activities directly or inherently involve or require some form of user interaction with the device. For example, the use of a camera, activating a microphone to record audio, and sending premium Short Message Service (SMS) messages are all tasks/activities that involve some form of user interaction with the device, such as the user actuating the shutter-release button for the camera, pressing a record button to active the microphone, typing text and touching a send button to send a SMS message, etc.

Most user interactions with the device will cause the computing device to generate one or more UI events (e.g., View::onTouchEvent, onKeyDown, onKeyUp, onTrackBallEvent, etc.). For example, touching an electronic touchscreen display of the computing device may cause a device driver to generate a "touch event" that identifies the area touched (e.g., via rectangular coordinates X and Y, etc). The operating system may receive the UI event (e.g., the "touch event") from the device driver, and in response, perform procedures of software applications for which the UI event is relevant.

Thus, some tasks/activities directly or inherently involve or require some form of user interaction and most user interactions generate some form of a UI event. As such, the performance of certain tasks/activities of an application program without a corresponding UI event may be strong indicator that the application program is non-benign or otherwise merits closer scrutiny, monitoring or analysis. Accordingly, in some embodiments, the behavior-based security system of the computing device could be configured to classify activities that directly or inherently involve or require a user interaction but are not associated with a UI event as suspicious or non-benign. For example, in an embodiment, the behavior-based security system may be configured to monitor an activity of a software application program, determine whether the monitored activity (e.g., use of a camera, etc.) directly or inherently involves or requires some form of user interaction, determine whether there is a UI event (e.g., onTouchEvent, etc.) that corresponds to the monitored activity in response to determining that the monitored activity directly or inherently involves or requires user interaction, and classify the application program as non-benign (or as requiring closer scrutiny, more detailed analysis, etc.) in response to determining that the monitored activity directly or inherently involves or requires user interaction and that there are no UI events that correspond to the monitored activity.

The behavior-based security system is generally effective at identifying non-benign behaviors and preventing the device's degradation in performance and power utilization levels over time. For example, by using UI event information as an indicator of whether an activity or software application is non-benign, the behavior-based security system allows the computing device to identify and respond to non-benign devices behaviors (e.g., malicious software applications, etc.) without consuming an excessive amount of its processing, memory or battery resources. As a result, the behavior-based security system is well suited for inclusion and use in mobile and resource constrained-computing devices, such as smartphones, which have limited resources, run on battery power, and for which performance and security are important.

While the above-described system is generally effective, a malicious software application could circumvent or evade detection by the security system by generating and sending fake UI event information to the device's operating system. For example, a malicious software application could activate the camera of the computing device to capture an image without the user's knowledge or consent, and then send a fake onTouchEvent to the device's operating system to cause the security system to incorrectly determine that the detected activity (activation of the camera) is associated with a corresponding UI event. This could cause the security system to incorrectly classify the malicious application program as benign.

By using behavior-based and machine learning techniques to analyze raw data generated by one or more hardware/device drivers in conjunction with UI event information received by the high-level operating system, the various embodiments allow the computing device to determine whether a UI event is a fake UI event, and use this information when analyzing device behaviors so as to prevent malicious software applications from using fake UI event information to circumvent or evade detection.

The various embodiments improve the functioning of the computing device by allowing the device to more accurately and efficiently identify, prevent, correct, and/or otherwise respond to non-benign software applications. The various embodiments also improve the functioning of the computing device by allowing the computing device (or its behavior-based security system) to use the UI event information to intelligently focus its monitoring and/or analysis operations, thereby reducing their impact on the responsiveness, performance, and power consumption characteristics of the device.

Additional improvements to the functions, functionalities, and/or functioning of computing devices will be evident from the detailed descriptions of the embodiments provided below.

The term "performance degradation" is used in this application to refer to a wide variety of undesirable operations and characteristics of a computing device, such as longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the mobile device or utilizing the phone for spying or botnet activities, etc. Also, behaviors, activities, and conditions that degrade performance for any of these reasons are referred to herein as "not benign" or "non-benign."

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various embodiments are particularly useful for mobile computing devices, such as smartphones, which have limited resources and run on battery, the embodiments are generally useful in any electronic device that includes a processor and executes application programs.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Further, modern mobile devices are highly configurable and complex systems. As such, the features that are most important for determining whether a particular device behavior is benign or non-benign (e.g., malicious or performance-degrading) may be different in each mobile device. In addition, there are a large variety of factors that may contribute to the degradation in performance and power utilization levels of a mobile computing device over time, including poorly written or designed software applications, malware, viruses, fragmented memory, background processes, etc. Due to the number, variety, and complexity of these factors, it is often not feasible to evaluate all of the factors that may contribute to the degradation in performance and/or power utilization levels of the complex yet resource-constrained systems of modern mobile computing devices. As such, it is difficult for users, operating systems, and/or application programs (e.g., anti-virus software, etc.) to accurately and efficiently identify the sources of problems. As a result, mobile device users currently have few remedies for preventing the degradation in performance and power utilization levels of a mobile device over time, or for restoring an aging mobile device to its original performance and power utilization levels.

To overcome the limitations of existing solutions, the various embodiments include computing devices equipped with a behavioral monitoring and analysis system configured to quickly and efficiently identify non-benign software applications (e.g., applications that are malicious, poorly written, incompatible with the device, etc.), and prevent such applications from degrading the a computing device's performance, power utilization levels, network usage levels, security, and/or privacy over time. The behavioral monitoring and analysis system may be configured to identify, prevent, and correct identified problems without having a significant, negative, or user perceivable impact on the responsiveness, performance, or power consumption characteristics of the computing device. In an embodiment, the behavioral monitoring and analysis system may be a behavior-based security system.

The behavior-based monitoring and analysis system may include an observer process, daemon, module, or sub-system (herein collectively referred to as a "module") a behavior extractor module, and an analyzer module. The observer module may be configured to instrument or coordinate various application programming interfaces (APIs), registers, counters, or other device components (herein collectively "instrumented components") at various levels of the computing device system, collect behavior information from the instrumented components, and communicate (e.g., via a memory write operation, function call, etc.) the collected behavior information to the behavior extractor module. The behavior extractor module may use the collected behavior information to generate behavior vectors that each represent or characterize many or all of the observed events, conditions, tasks, activities, and/or behaviors (herein collectively "behaviors") associated with one or more specific threads, processes, software applications, modules, or components of the device. The behavior extractor module may communicate (e.g., via a memory write operation, function call, etc.) the generated behavior vectors to the analyzer module, which may apply the behavior vectors to classifier models to generate analysis results, and use the analysis results to determine whether a software application or device behavior is benign or non-benign (e.g., malicious, poorly written, performance-degrading, etc.). The device processor may then perform various operations to correct, heal, cure, isolate, or otherwise fix the identified problems (e.g., behaviors determined to be non-benign).

Each behavior vector may be an information structure that includes or encapsulates one or more "behavior features." A behavior feature may be a number or symbol that represents all or a portion of an observed event, condition, activity, operation, relationship, interaction, or behavior in the computing device. Each behavior feature may be associated with a data type that identifies a range of possible values, operations that may be performed on those values, the meanings of the values, and other similar information. The data type may be used by the computing device to determine how the corresponding behavior feature (or feature value) should be measured, analyzed, weighted, or used.

A classifier model may be a behavior model that includes data, entries, decision nodes, decision criteria, and/or information structures that may be used by a device processor to quickly and efficiently test or evaluate specific features, factors, data points, entries, APIs, states, conditions, behaviors, software applications, processes, operations, components, etc. (herein collectively "features") or other embodiments of the device's behavior. A classifier model may also include information that may be used by a device processor to determine the nature of the relationships between software applications and/or the behaviors that to be monitored in the mobile device.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes or prioritizes tests on the features/entries that are most relevant for determining whether a particular mobile device behavior is not benign. A local classifier model may be a lean classifier model that is generated in the computing device. A user-specific classifier model may be a local classifier model that includes a highly focused data model that includes or prioritizes decision nodes that test or evaluate device features/entries that are most relevant for determining whether a device behavior is consistent with the ordinary usage of the computing device by a specific user.

Each person generally interacts with his/her computing device in a unique or distinct way. For example, mobile device users often have a distinct work or communication style, use specific software applications or specific types of software applications, use their mobile device to perform specific activities or accomplish specific tasks, perform activities in a specific order, perform specific activities at specific times, interact with specific software applications in a specific ways, etc. The distinct way in which a user interacts with his/her device may be learned over time, and used to determine whether a software application is non-benign. For example, in an embodiment, the computing device may be configured to learn the distinct way in which a user interacts with his/her device over time, use this information to determine whether an activity, task, or behavior should be associated with a corresponding UI event, generate behavior vectors and/or classifier models that account for the existence of a corresponding UI event, apply the behavior vectors to the classifier models to generate analysis results, and use the analysis results to determine whether a software application associated with the activity, task, or behavior is non-benign (e.g., malicious, etc.).

Modern computing devices have unprecedented levels of access to information that is generated by, or which relates to, their users. For example, mobile computing devices are often equipped with sensors (e.g., accelerometer, gyroscope, geo-spatial positioning sensor, camera, heart rate monitor, glucometer, etc.) that collect or generate detailed personal information about the user. In addition, mobile computing devices now include powerful processors that allow for executing complex software applications, including applications for navigating the web, purchasing goods, monitor the user's health, controlling home appliances, playing games, watching/recording videos, navigating new cities, tracking workouts, conducting financial transactions, etc. These software applications often collect or generate detailed personal information about the user. The information that is collected, generated, or used by these software applications and sensors may be used by an embodiment computing device to generate user-persona information that characterizes the activities, preferences, age, occupation, habits, moods, emotional states, personality, etc. of the user. An embodiment computing device may be configured to collect and use such user-persona information to determine the normal operating patterns of the device over time, including whether an activity, task, or behavior should be associated with a corresponding UI event. The user-persona information may also be used to generate behavior vectors and/or classifier models (e.g., user-specific classifier models, etc.) that are suitable for use in determining whether a software application is non-benign.

Certain tasks/activities directly or inherently involve or require that the operating system or software application (or process, thread, etc.) be in an execution state that supports or is compatible with those tasks/activities. For example, the use of a camera, sending Short Message Service (SMS) messages, and the collection accelerometer data are all tasks/activities that typically require some form of user interaction with the device. As such, these activities generally must be performed in the "foreground" execution state or in another execution state that supports user interaction with the computing device. When these or other similar tasks/activities are preformed in an execution state that does not support a high degree of user interaction with the device, such as in the background execution state, this operating condition may be an indicator that a device behavior associated with that activity is non-benign or otherwise merits additional or closer scrutiny, monitoring or analysis. As such, in an embodiment, the computing device may be configured to use the specific execution state in which an activity or task is performed to determine whether an activity, task, or behavior should be associated with a corresponding UI event, generate behavior vectors and/or classifier models that account for the execution state and/or the existence of a corresponding UI event, apply the behavior vectors to the classifier models to generate analysis results, and use the analysis results to determine whether a software application is non-benign.

In an embodiment, the behavioral monitoring and analysis system may use the existence of a UI event as a factor that is tested/evaluated (e.g., via the application of a behavior vector to classifier model, etc.) when generating the analysis results that are used to determine whether a software application is non-benign.

In the above examples, the computing device uses information generated via the user interaction with the device, such as the presence of a corresponding UI event, to determine whether a software application is non-benign. Such information typically includes data generated by the device's sensors or hardware (e.g., when a user touches device's touch screen, etc.), which is sent to the operating system for forwarding to the behavioral monitoring and analysis system (e.g., via the operating system storing the information in a log, etc.). Since the behavioral monitoring and analysis system uses this information to determine whether a software application is non-benign, a malicious software application could attempt to evade or circumvent detection by the system by generating and sending fake UI event information to the operating system, such as to cause the operating system to incorrectly report the presence of a UI event to the behavioral monitoring and analysis system.

To prevent software applications that generate fake user interaction information (e.g., fake UI events) from evading or circumventing detection by the behavioral monitoring and analysis system (e.g., behavior-based security system), in an embodiment, the computing device may be equipped with a fake UI event detection module that is configured to receive raw data from sensor and hardware drivers and UI event information from the operating system, compare the received raw data to the received UI event information to determine whether a UI event is an authentic UI event or a fake UI event, and report fake UI event events to the behavioral monitoring and analysis system.

In an embodiment, the behavioral monitoring and analysis system may be configured to classify software applications that are associated with a fake UI event as non-benign.

In an embodiment, the behavioral monitoring and analysis system may be configured to classify software applications that are associated with a fake UI event as suspicious, and increase its level of scrutiny or analysis (e.g., by using more robust classifier models, monitoring more activities of the software application, generating larger behavior vectors, etc.).

In an embodiment, the behavioral monitoring and analysis system may be configured to ignore UI events that are determined to be fake UI events, such as by using a classifier model that does not test conditions relating to the presence or existence of a corresponding UI event. This allows the system to focus its monitoring and/or analysis operations are the features or factors that are most important to determining whether the activity or behavior is non-benign.

In an embodiment, the device processor of the computing device may be configured to compare and correlate information received from different device drivers or hardware components to determine whether a detected UI event is a fake UI event. For example, touching the computing device's touch screen display by the user may cause the display to generate raw data in the form of a timestamp identifying the time in which the display was touched and coordinate information identifying the touched display area. In addition, since the computing device typically moves when its display is touched (due to the force of the user's touch), its gyroscope and accelerometer may generate raw data that indicates that the device moved slightly at the same time as the touch event. As such, the device processor may determine whether the device's movement at the time when the touch event was generated is consistent with that user interaction.

The various embodiments (including the embodiments described with reference to FIGS. 2-7), may be implemented in a number of different mobile devices, including single processor and multiprocessor systems, and a system-on-chip (SOC). FIG. 1 is an architectural diagram illustrating an example system-on-chip (SOC) 100 architecture that may be used in computing devices implementing the various embodiments. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector co-processor) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 10).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components/resources 116, such as voltage regulators, oscillators, phase-locked loops, peripheral bridges, data controllers, memory controllers, system controllers, access ports, timers, and other similar components used to support the processors and clients running on a computing device.

The system components/resources 116 and custom circuitry 114 may include circuitry to interface with peripheral devices, such as cameras, electronic displays, wireless communication devices, external memory chips, etc. The processors 102, 104, 106, 108 may be interconnected to one or more memory elements 112, system components/resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to the SOC 100 discussed above, the various embodiments may be implemented in a wide variety of computing systems, which may include a single processor, multiple processors, multicore processors, or any combination thereof.

Figure 2:
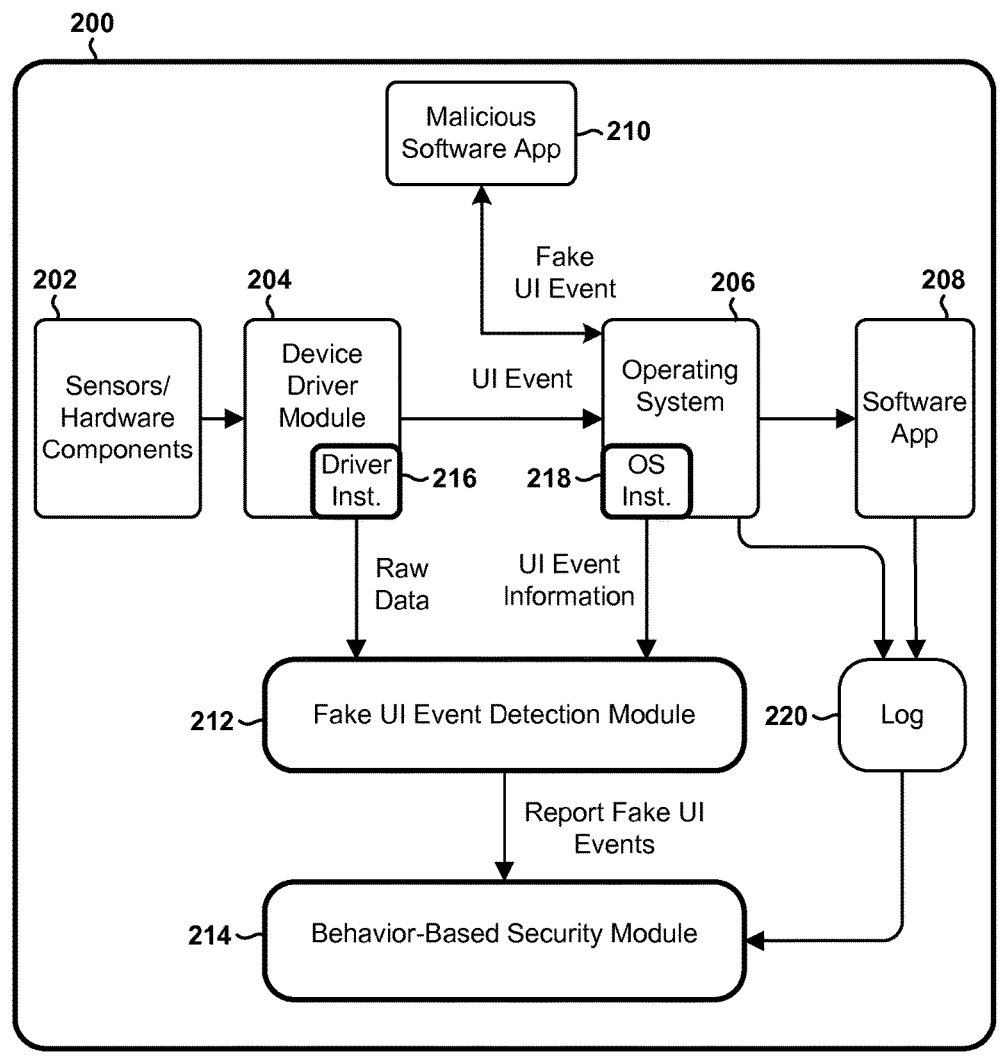
FIG. 2 is a block diagram illustrating example logical components and information flows in an embodiment computing device that includes a fake user interaction (UI) event detection module configured to identify and respond to fake UI events in accordance with the various embodiments.

FIG. 2 illustrates example logical components and information flows in an embodiment computing device 200 configured to identify fake UI events in accordance with the various embodiments. In the example illustrated in FIG. 2, the computing device 200 includes various sensors and hardware components 202, a device driver module 204, an operating system 206, a fake UI event detection module 212, a behavior-based security module 214, and a log of actions 220. The computing device also includes a software application program 208 and a malicious software application program 210, both of which may operate or execute on the computing device 200 via one or more of its processors or processing cores.

The software application programs 208, 210 may use an application program interface (API) to invoke services of the operating system 206. The operating system 206 may communicate with the sensor/hardware components 202 via the device driver module 204, which may serve as or provide a software interface between the sensor/hardware components 202 and the operating system 206. The device driver module 204 may be configured to control or communicate with the sensor/hardware components 202 via the operation codes (opcodes) and native commands implemented by the sensor/hardware components 202. The device driver module 204 may be configured to use raw data received from the sensor/hardware components 202 to generate information that is suitable for interpretation and use by the operating system 206.

The sensor/hardware components 202 may be configured to generate and send raw data to the device driver module 204 in response to detecting user interaction events, and the device driver module 204 may be configured to use the raw data received from the sensor/hardware components 202 to generate UI event information that is suitable for interpretation and use by the operating system 206. For example, the sensor/hardware components 202 may include an electronic touchscreen display (e.g., capacitive sensing touchscreen panel, etc.) configured to send raw data in the form of X and Y location coordinates to the device driver module 204 each time a user touches the touchscreen. The device driver module 204 may be configured to convert this raw data (i.e., location coordinates X and Y) into UI event information (e.g., screenTouch(X,Y)) that is suitable for interpretation and use by the operating system 206. The operating system 206 may receive and use the UI event information to determine that an onTouch(X,Y) function of the software application program 208 should be invoked, and cause the software application program 208 to perform operations of the onTouch(X,Y) function. Such operations may include opening a camera shutter, capturing an image, processing a captured image, etc.

Both the operating system 206 and the software application program 208 may log their respective operations, activities and/or task in a log of actions 220. For example, the operating system may log the detection of the UI event (e.g., screenTouch(X,Y)) in the log of actions 220, and the software application program 208 may log the operations (e.g., opening the camera shutter, capturing the image, writing the information to memory, etc.) or their associated API calls in the log of actions 220.

The behavior-based security module 214 may be configured to monitor the operations, activities of the software application program 208, collect behavior information from the log of actions 220, use the collected behavior information to generate behavior vector structures, apply the generated behavior vector structures to classifier models to generate analysis results, and use the analysis results to determine whether the software application program 208 is non-benign. As part of these operations, the behavior-based security module 214 may determine that a behavior or activity of software application program 208 directly or inherently involve or requires some form of user interaction with the device, determine whether the log of actions 220 includes a UI event corresponding to the behavior/activity in response to determining that the behavior/activity directly or inherently involve or requires user interaction, and use a behavior vector and/or classifier model that evaluates the presence or existence of a corresponding UI event when determining whether the software application program 208 is non-benign.

In the example illustrated in FIG. 2, the malicious software application program 210 attempts to evade or circumvent detection by the behavior-based security module 214 by generating and sending fake UI event to the operating system. For example, the malicious software application program 210 may the activate the camera to capture an image without the user's knowledge consent, and cause the operating system to incorrectly log the presence of a UI event corresponding the activation of the camera. This could cause the behavior-based security module 214 to incorrectly determine there is a UI event that corresponds to the monitored activity.

The fake UI event detection module 212 may be configured to prevent the malicious software application program 210 from evading or circumventing detection by the behavior-based security module 214. The device driver module 204 may include a driver instrumentation module 216 that is configured to send raw data to the fake UI event detection module 212, and the operating system 206 may include an operating system instrumentation module 218 that is configured to send UI event information to the fake UI event detection module 212. The fake UI event detection module 212 may be configured to receive the raw data from driver instrumentation module 216 and the UI event information from the operating system instrumentation module 218, compare the received raw data to the received UI event information to determine whether the UI event is an authentic UI event or a fake UI event, and report fake UI event events to the behavior-based security module 214.

In response to receiving a report of a fake UI event, the behavior-based security module 214 may classify software applications associated with the fake UI event as non-benign, classify software applications that are associated with the fake UI event as suspicious, update the classifier models to exclude decision nodes that test conditions relating to the presence/existence of UI events, or select/use behavior vectors and classifier models that do not test conditions relating to the presence/existence of UI events.

Figure 3:
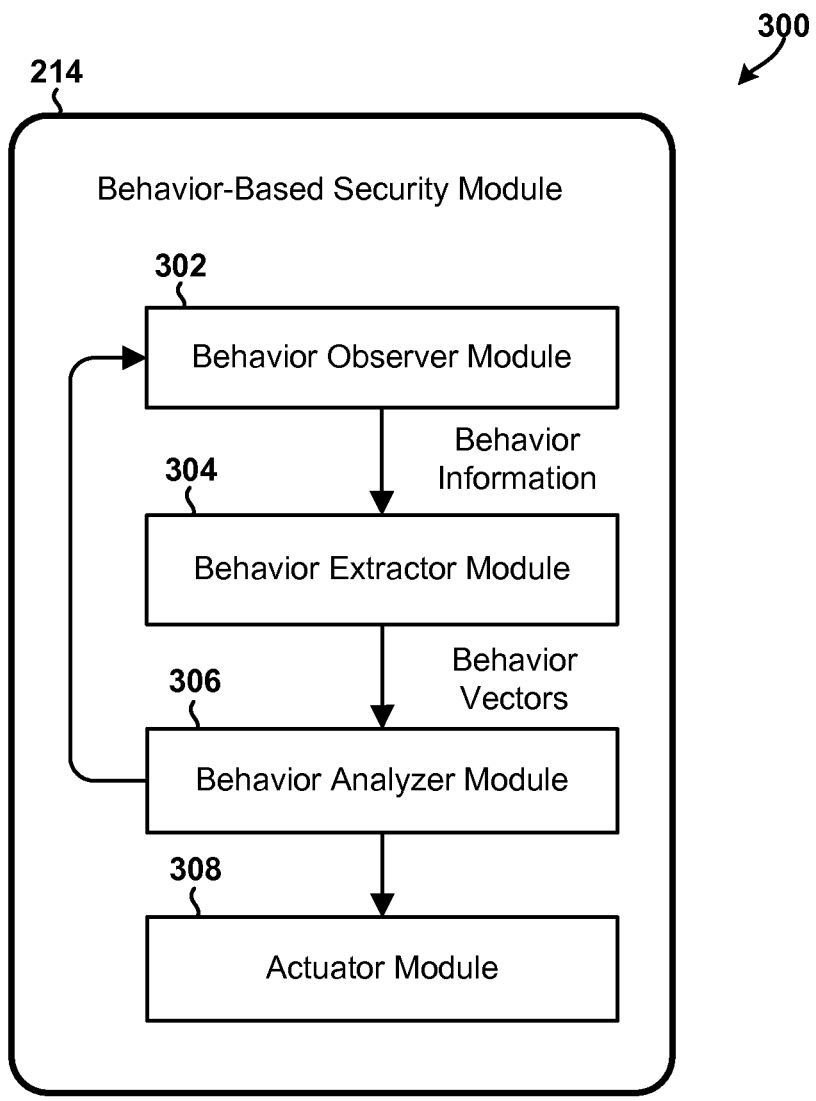
FIG. 3 is a block diagram illustrating example logical components and information flows in an embodiment computing device configured to determine whether a particular mobile device behavior is benign or non-benign.

FIG. 3 illustrates example logical components and information flows in an embodiment computing device that includes a behavior-based security module 214 configured to use behavioral analysis techniques to identify and respond to non-benign device behaviors. In the example illustrated in FIG. 3, the computing device is a mobile device 300 that includes a device processor (i.e., mobile device processor) configured with executable instruction modules that include a behavior observer module 302, a behavior extractor module 304, a behavior analyzer module 306, and an actuator module 308. Each of the modules 302-308 may be a thread, process, daemon, module, sub-system, or component that is implemented in software, hardware, or a combination thereof. In various embodiments, the modules 302-308 may be implemented within parts of the operating system (e.g., within the kernel, in the kernel space, in the user space, etc.), within separate programs or applications, in specialized hardware buffers or processors, or any combination thereof. In an embodiment, one or more of the modules 302-308 may be implemented as software instructions executing on one or more processors of the mobile device 300.

The behavior observer module 302 may be configured to instrument application programming interfaces (APIs), counters, hardware monitors, etc. at various levels/modules of the device, and monitor the activities, conditions, operations, and events (e.g., system events, state changes, etc.) at the various levels/modules over a period of time. The behavior observer module 302 may collect behavior information pertaining to the monitored activities, conditions, operations, or events, and store the collected information in a memory (e.g., in a log file, etc.).

In some embodiments, the behavior observer module 302 may be configured to collect user-based information (e.g., user-persona information, etc.) from software applications operating in the computing device, the sensors of the computing device, and/or from the user's interactions with the computing device or its software applications. The user-based information may include any information that is suitable for identifying or characterizing the activities, device usage patterns, habits, moods, occupation, and/or emotional states of the device user. As examples, the user-based information may include information identifying the user's interactions with the device, number and types of customizations performed on the device, types of software applications downloaded or used by a user, the rate at which the user touches or interacts with the screen, the device's graphics processing unit (GPU) usage level, how often the user uses the device to communicate with others, the user's preferred method of communication (e.g., text vs. voice), how fast the user communicates, the device memory size, etc. The device processor may use the collected user-based information to learn how the user typically interacts with the computing device, to determine the normal operating patterns of the device and/or to determine whether an activity, task, or behavior should be associated with a UI event. For example, the device process may use the user-based information to determine whether the normal operating patterns of the device indicate that a specific activity is associated with a specific UI event and/or that the performance of a specific activity without its corresponding UI event is not consistent with the normal operating patterns of the device.

The behavior observer module 302 may be configured to collect the user-persona information by monitoring any of a variety of software applications (or software application types), including calendar applications, reminder applications, communication applications, financial applications, applications for accomplishing specific tasks (e.g., word processing, preparing tax reforms, presentation applications, accounting applications, etc.), location based applications (e.g., mapping and geolocation apps, etc.), social media applications, web browsers (e.g., to obtain information regarding past searches, browsing history, types of websites visited, content of websites visited, etc.), entertainment applications (e.g., an audio or multimedia player application), applications for accessing user accounts (e.g., banking apps, etc.), personal training and development applications, etc.

The behavior observer module 302 may also collect user-persona information by obtaining data from a heart rate monitor, blood pressure monitor, thermometer, pedometer, blood glucose meter, humidity sensor, breathalyzer, galvanic skin response sensor, or other sensor in the device. For example, the behavior observer module 302 may collect user-persona information by monitoring geo-spatial positioning and navigation systems of the device to determine user's current location (e.g., at the office, at home, at a restaurant, a gym, traveling, etc.), the user's current movements (e.g., is currently traveling, is exercising, is stationary, etc.), history of movements (e.g., travels extensively, never leaves town, etc.), whether the user is following his/her established routine (e.g., arrived to work on time, still at work) or is off his/her routine (e.g., arrived later than usual, left earlier than usual).

In some embodiments, a device processor of the mobile device 300 may be configured to use the user-persona information and/or information characterizing the user's interaction with the device to generate the behavior vectors and/or classifier models. For example, the device processor may be configured to use user interaction information to dynamically determine the device features that are monitored, the behavior information that is included in the behavior vectors, the specific device features that are included in (and thus evaluated by) the classifier models, etc. As another example, the device processor may be configured to generate a classifier model that evaluates conditions/features focused on identifying the presence of UI events during the use or execution of certain types of software applications (e.g., games, etc.).

In some embodiments, the device processor may be configured to determine whether the user-interaction information is relevant to analyzing all or portions of the collected behavior information, generate a classifier model that includes a decision node that evaluates a device feature in relation to a user-interaction (if relevant), generate a behavior vector that correlates the collected behavior information for which user-interaction is relevant, and apply the generated behavior vector to the generated classifier model to determine whether a device behavior is non-benign.

The behavior observer module 302 may also be configured to monitor the activities of the mobile device 300 by collecting information pertaining to library application programming interface (API) calls in an application framework or run-time libraries, system call APIs, file-system and networking sub-system operations, device (including sensor devices) state changes, and other similar events. In addition, the behavior observer module 302 may monitor file system activity, which may include searching for filenames, categories of file accesses (personal info or normal data files), creating or deleting files (e.g., type exe, zip, etc.), file read/write/seek operations, changing file permissions, etc.

The behavior observer module 302 may also monitor the activities of the mobile device 300 by monitoring data network activity, which may include types of connections, protocols, port numbers, server/client that the device is connected to, the number of connections, volume or frequency of communications, etc. The behavior observer module 302 may monitor phone network activity, which may include monitoring the type and number of calls or messages (e.g., SMS, etc.) sent out, received, or intercepted (e.g., the number of premium calls placed).

The behavior observer module 302 may also monitor the activities of the mobile device 300 by monitoring the system resource usage, which may include monitoring the number of forks, memory access operations, number of files open, etc. The behavior observer module 302 may monitor the state of the mobile device 300, which may include monitoring various factors, such as whether the display is on or off, whether the device is locked or unlocked, the amount of battery remaining, the state of the camera, etc. The behavior observer module 302 may also monitor inter-process communications (IPC) by, for example, monitoring intents to crucial services (browser, contracts provider, etc.), the degree of inter-process communications, pop-up windows, etc.

The behavior observer module 302 may also monitor the activities of the mobile device 300 by monitoring driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile device 300.

The behavior observer module 302 may also monitor the activities of the mobile device 300 by monitoring one or more hardware counters that denote the state or status of the mobile device 300 and/or computing device sub-systems. A hardware counter may include a special-purpose register of the processors/cores that is configured to store a count value or state of hardware-related activities or events occurring in the mobile device 300.

The behavior observer module 302 may also monitor the activities of the mobile device 300 by monitoring the actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 302 may also monitor the activities of the mobile device 300 by monitoring transmissions or communications of the mobile device 300, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 302 may also monitor the activities of the mobile device 300 by monitoring the usage of, and updates/changes to, compass information, computing device settings, battery life, gyroscope information, pressure sensors, magnet sensors, screen activity, etc. The behavior observer module 302 may monitor notifications communicated to and from a software application (AppNotifications), application updates, etc. The behavior observer module 302 may monitor conditions or events pertaining to a first software application requesting the downloading and/or install of a second software application. The behavior observer module 302 may monitor conditions or events pertaining to user verification, such as the entry of a password, etc.

The behavior observer module 302 may also monitor the activities of the mobile device 300 by monitoring conditions or events at multiple levels of the mobile device 300, including the application level, radio level, and sensor level. Application level observations may include observing the user via facial recognition software, observing social streams, observing notes entered by the user, observing events pertaining to the use of PassBook®, Google® Wallet, Paypal®, and other similar applications or services. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile device 300 before establishing radio communication links or transmitting information, dual/multiple subscriber identification module (SIM) cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device 300. For example, the computing device processor may be configured to determine whether the device is in a holster (e.g., via a magnet sensor configured to sense a magnet within the holster) or in the user's pocket (e.g., via the amount of light detected by a camera or light sensor). Detecting that the mobile device 300 is in a holster may be relevant to recognizing suspicious behaviors, for example, because activities and functions related to active usage by a user (e.g., taking photographs or videos, sending messages, conducting a voice call, recording sounds, etc.) occurring while the mobile device 300 is holstered could be signs of nefarious processes executing on the device (e.g., to track or spy on the user).

Other examples of sensor level observations related to usage or external environments may include, detecting near-field communication (NFC) signaling, collecting information from a credit card scanner, barcode scanner, or mobile tag reader, detecting the presence of a Universal Serial Bus (USB) power charging source, detecting that a keyboard or auxiliary device has been coupled to the mobile device 300, detecting that the mobile device 300 has been coupled to another computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device 300 is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device 300, etc.

To reduce the number of factors monitored to a manageable level, in an embodiment, the behavior observer module 302 may be configured to perform coarse observations by monitoring/observing an initial set of behaviors or factors that are a small subset of all factors that could contribute to the computing device's degradation. In an embodiment, the behavior observer module 302 may receive the initial set of behaviors and/or factors from a server and/or a component in a cloud service or network. In an embodiment, the initial set of behaviors/factors may be specified in machine learning classifier models.

The behavior observer module 302 may communicate (e.g., via a memory write operation, function call, etc.) the collected behavior information to the behavior extractor module 304. The behavior extractor module 304 may be configured to receive or retrieve the collected behavior information, and use this information to generate one or more behavior vectors. Each behavior vector may succinctly describe the behavior of the device, software application, or process in a value or vector data-structure. The vector data-structure may include series of numbers, each of which signifies a feature or a behavior of the mobile device, such as whether a camera of the mobile device is in use (e.g., as zero or one), how much network traffic has been transmitted from or generated by the mobile device (e.g., 20 KB/sec, etc.), how many Internet messages have been communicated (e.g., number of SMS messages, etc.), and/or any other behavior information collected by the behavior observer module 302. In an embodiment, the behavior extractor module 304 may be configured to generate the behavior vectors so that they function as an identifier that enables the mobile device system (e.g., the behavior analyzer module 306) to quickly recognize, identify, or analyze a behavior of the device.

In an embodiment, the behavior extractor module 304 may be configured to generate the behavior vectors to include information that may be input to a feature/decision node in the machine learning classifier to generate an answer to a query regarding a monitored activity or activities.

In an embodiment, the behavior extractor module 304 may be configured to generate the behavior vectors to include execution information. The execution information may be included in the behavior vector as part of a behavior (e.g., camera used five times in three second by a background process, camera used three times in three second by a foreground process, etc.) or as part of an independent feature. In an embodiment, the execution state information may be included in the behavior vector as a shadow feature value sub-vector or data structure. In an embodiment, the behavior vector may store the shadow feature value sub-vector/data structure in association with the features, activities, tasks for which the execution state is relevant.

The behavior extractor module 304 may communicate (e.g., via a memory write operation, function call, etc.) the generated behavior vectors to the behavior analyzer module 306. The behavior analyzer module 306 may be configured to apply the behavior vectors to classifier modules to determine whether a device behavior is a non-benign behavior that is contributing to (or is likely to contribute to) the device's degradation over time and/or which may otherwise cause problems on the device.

Each classifier model may be a behavior model that includes data and/or information structures (e.g., feature vectors, behavior vectors, component lists, etc.) that may be used by a computing device processor to evaluate a specific feature or embodiment of a computing device's behavior. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular activity is an ongoing critical activity and/or whether a particular computing device behavior is not benign. As an example, a device processor may be may be configured to receive a full classifier model from a network server, generate a lean classifier model in the mobile device based on the full classifier, and use the locally generated lean classifier model to classify a behavior of the device as being either benign or non-benign (i.e., malicious, performance degrading, etc.).

A locally generated lean classifier model is a lean classifier model that is generated in the computing device. That is, since mobile devices are highly configurable and complex systems, the features that are most important for determining whether a particular device behavior is non-benign (e.g., malicious or performance-degrading) may be different in each device. Further, a different combination of features may require monitoring and/or analysis in each device in order for that device to quickly and efficiently determine whether a particular behavior is non-benign. Yet, the precise combination of features that require monitoring and analysis, and the relative priority or importance of each feature or feature combination, can often only be determined using information obtained from the specific device in which the behavior is to be monitored or analyzed. For these and other reasons, various embodiments may generate classifier models in the mobile device in which the models are used. These local classifier models allow the device processor to accurately identify the specific features that are most important in determining whether a behavior on that specific device is non-benign (e.g., contributing to that device's degradation in performance). The local classifier models also allow the device processor to prioritize the features that are tested or evaluated in accordance with their relative importance to classifying a behavior in that specific device.

A device-specific classifier model is a classifier model that includes a focused data model that includes/tests only computing device-specific features/entries that are determined to be most relevant to classifying an activity or behavior in a specific computing device.

An application-specific classifier model is a classifier model that includes a focused data model that includes/tests only the features/entries that are most relevant for evaluating a particular software application.

A user-specific classifier model may be a local classifier model that includes a focused data model that includes or prioritizes tests on the features/entries that are most relevant for identifying a user of the device, determining the persona of the user, determining whether a device behavior is consistent with the persona of an identified user, determining whether a device behavior is consistent with the ordinary usage of that device by one of its identified users, or for determining whether a user's activities are indicative of a non-benign device behavior.

By dynamically generating user-specific, device-specific, and/or application-specific classifier models locally in the mobile device, the various embodiments allow the device processor to focus its monitoring and analysis operations on a small number of features that are most important for determining whether the operations of that specific mobile device and/or of a specific software application operating in that device are consistent with the personality, habits, or ordinary usage patterns of a known user of that specific device.

In an embodiment, the behavior analyzer module 306 may be configured to classify a behavior as "suspicious" when the results of its behavioral analysis operations do not provide sufficient information to classify a device behavior as either benign or non-benign. The behavior analyzer module 306 may be configured to notify the behavior observer module 302 in response to determining that a device behavior is suspicious. In response, the behavior observer module 302 may adjust the granularity of its observations (i.e., the level of detail at which computing device features are monitored) and/or change the factors or behaviors that are monitored based on information received from the behavior analyzer module 306 (e.g., results of the real-time analysis operations), generate or collect new or additional behavior information, and send the new/additional information to the behavior analyzer module 306 for further analysis/classification. Such feedback communications between the behavior observer module 302 and the behavior analyzer module 306 enable the mobile device 300 to recursively increase the granularity of the observations (i.e., make finer or more detailed observations) or change the features/behaviors that are observed until a collective behavior is classified as benign or non-benign, a source of a suspicious or performance-degrading behavior is identified, until a processing or battery consumption threshold is reached, or until the device processor determines that the source of the suspicious or performance-degrading device behavior cannot be identified from further changes, adjustments, or increases in observation granularity. Such feedback communication also enable the mobile device 300 to adjust or modify the behavior vectors and classifier models without consuming an excessive amount of the computing device's processing, memory, or energy resources.

In an embodiment, the behavior analyzer module 306 may be configured to receive and analyze information collected by various mobile device sub-systems and/or over various time periods to learn the normal operational behaviors of the mobile device under a variety of contexts and conditions, and generate models of normal mobile device behaviors (e.g., in the form of classifier models, etc.) under the various contexts/conditions. In an embodiment, the behavior analyzer module 306 may be configured to correlate the collected behavior information or behavior vectors against the generated behavior models, and perform behavior analysis operations based on the correlations to determine whether the received observations conflict with (or do not match) the learned normal operational behaviors.

As a high-level example, the mobile device 300 might detect (via the collected behavior information) that a camera has been used, that the mobile device 300 is attempting to upload the picture to a server, and that an application on the mobile device took the picture while the device was holstered and attached to the user's belt. The mobile device 300 may determine whether this detected behavior (e.g., usage of the camera while holstered) is a behavior that is acceptable or common to the user. This may be achieved by comparing the detected behavior (e.g., the generated behavior vector) with past behaviors of the mobile device 300 or user. Since taking pictures and uploading them to a server while holstered is an unusual behavior (as may be determined from observed normal behaviors in the context of being holstered), in this situation the computing device may recognize this as being inconsistent with a pattern of ordinary usage of the computing device by the user, and initiate an appropriate response (e.g., shutting off the camera, sounding an alarm, etc.).

In the various embodiments, the mobile device 300 may be configured to work in conjunction with a network server to intelligently and efficiently identify the features, factors, and data points that are most relevant to determining whether an activity or behavior is non-benign. For example, the device processor may be configured to receive a full classifier model from the network server, and use the received full classifier model to generate lean classifier models (i.e., data/behavior models) that are specific for the users of the device and/or to the features and functionalities of the device or its software applications. The device processor may use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the classifier model cannot categorize as either benign or not benign (and therefore is categorized by the model as suspicious), at which time a more robust (i.e., less lean) lean classifier model may be applied in an attempt to categorize the behavior. The application of ever more robust lean classifier models within the family of generated lean classifier models may be applied until a definitive classification of the behavior is achieved. In this manner, the device processor can strike a balance between efficiency and accuracy by limiting the use of the most complete, but resource-intensive lean classifier models to those situations where a robust classifier model is needed to definitively classify a behavior.

In various embodiments, the device processor may be configured to generate lean classifier models by converting a finite state machine representation or expression included in a full classifier model into boosted decision stumps. The device processor may prune or cull the full set of boosted decision stumps based on the user-persona information or user-specific device features to generate a lean classifier model that includes a subset of boosted decision stumps included in the full classifier model. The device processor may then use the lean classifier model to intelligently monitor, analyze and/or classify a device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions). Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the computing device).

Figure 4A:
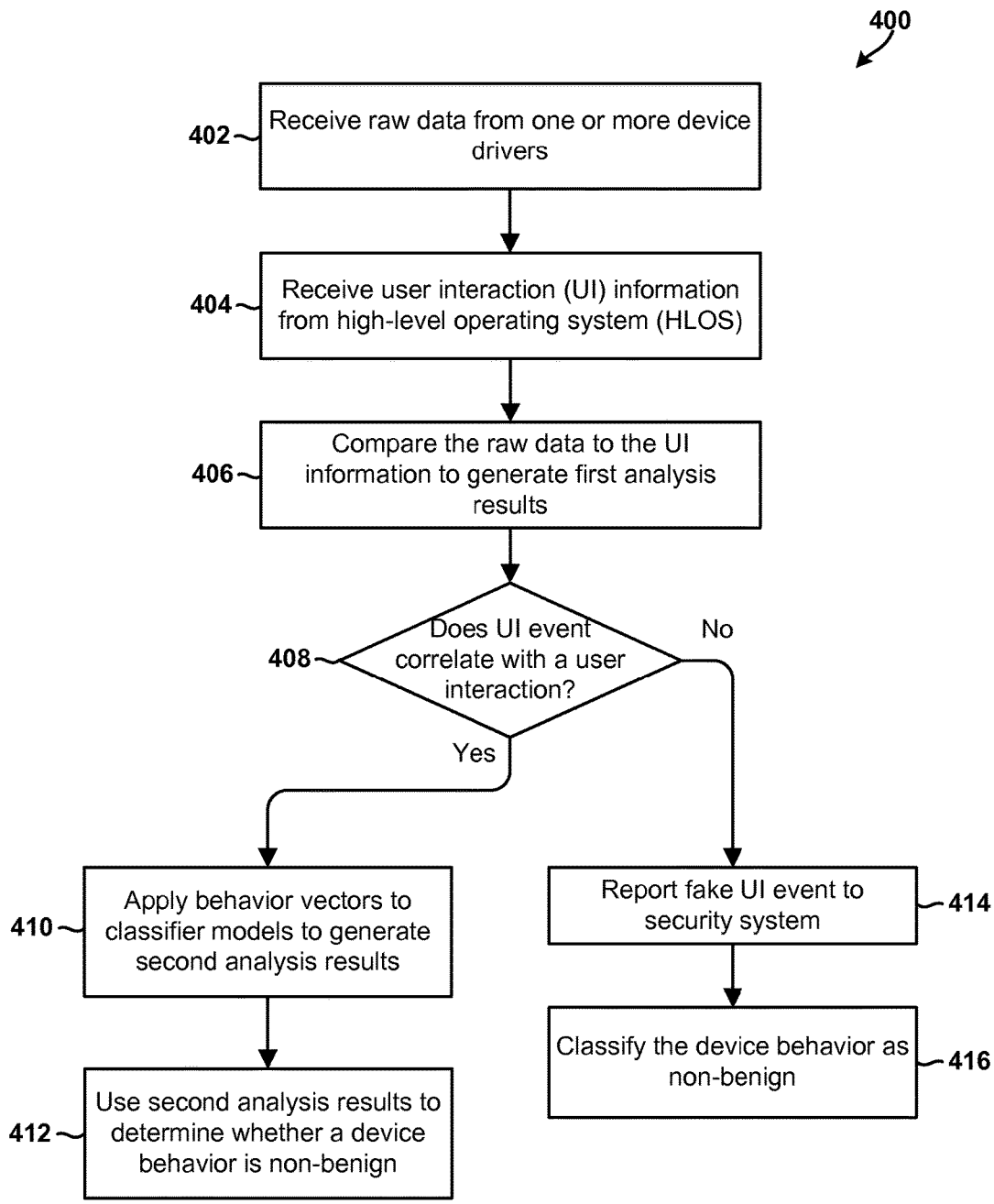
FIGS. 4A and 4B are process flow diagrams illustrating methods of detecting and responding to fake UI events in accordance with various embodiments.

FIG. 4A illustrates a method 400 of detecting and responding to fake UI events in accordance with an embodiment. The method 400 may be performed by a device processor of a mobile or resource constrained computing device. In block 402, the device processor may receive raw data from one or more device drivers of the computing device. In block 404, the device processor may receive user interaction (UI) information from high-level operating system (HLOS) of the computing device. In block 406, the device processor may compare the raw data received from a device driver to the user interaction event information received from the HLOS to generate a first analysis result.

In determination block 408, the device processor may use the generated first analysis result to determine whether the user interaction (UI) event correlates with a user interaction. This determination may evaluate whether the raw data received from one or more device drivers matches or otherwise correlates to the UI event reported to/by the HLOS. If the device driver raw data does not correlate (or match) to the UI information from the HLOS this may indicate that the received UI event is a fake, and the computing device may classify the detected UI event as a fake UI event.

In response to determining that the UI event correlates with a user interaction, and thus the UI event is not a fake UI event (i.e., determination block 408="Yes"), the device processor may apply behavior vectors to classifier models to generate a second analysis result in block 410. In block 412, the device processor may use the second analysis results to determine whether a device behavior is non-benign. As part of the operations of blocks 410 and 412, the device processor may perform any or all of the operations discussed above with reference FIG. 3.

In response to determining that the UI event does not correlate with a user interaction, and thus the UI event is a fake UI event (i.e., determination block 408="No"), the device processor may report the fake UI event to the behavior-based security system of the computing device in block 414. In block 414, the device processor may (e.g., via the behavior-based security system) classify the device behavior as non-benign. Thus, in an embodiment, the behavior-based security system may be configured to classify all software application programs that are determined to be associated with a fake UI event as non-benign.

Figure 4B:
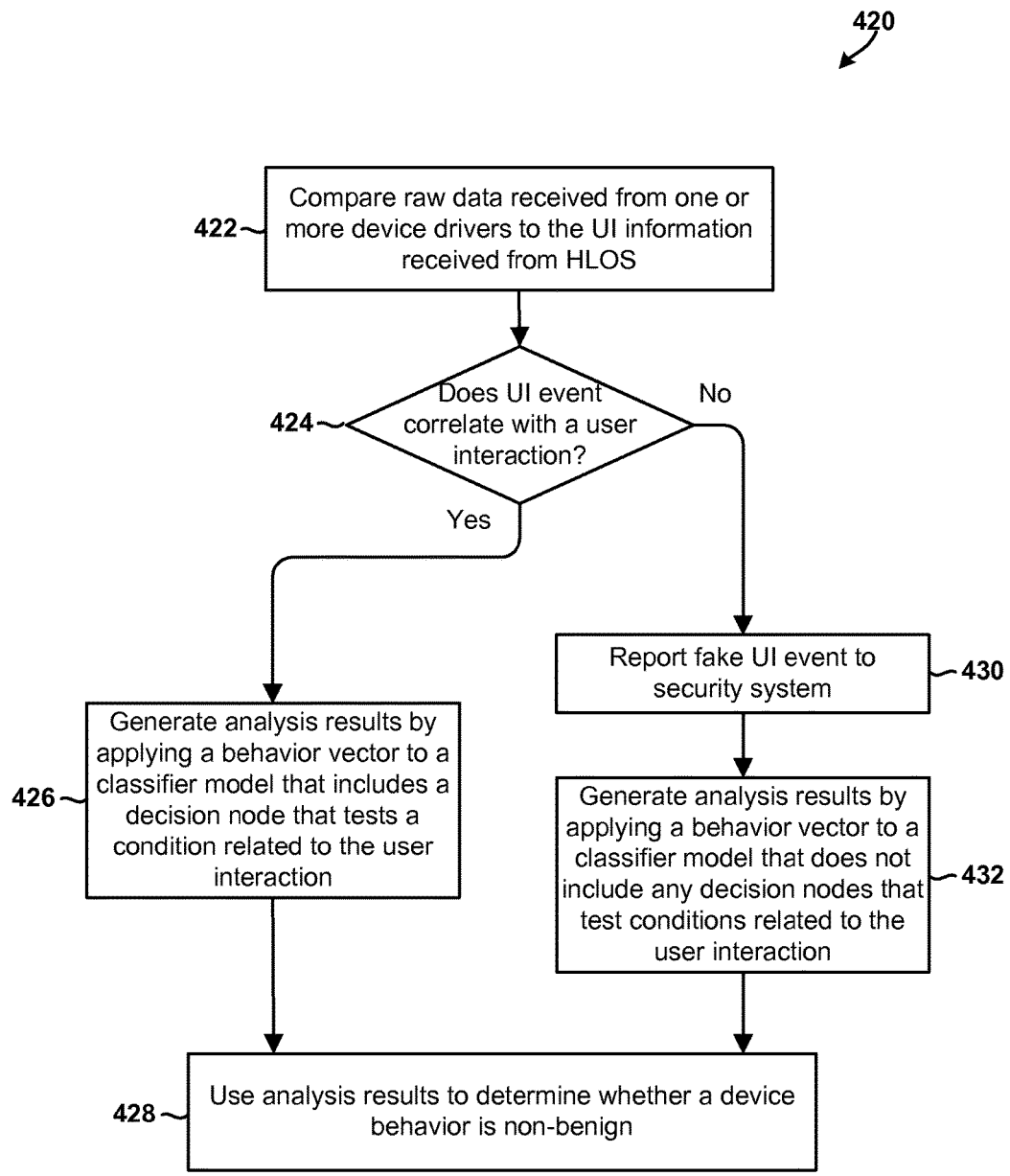

FIG. 4B illustrates another method 420 of detecting and responding to fake UI events in accordance with another embodiment. The method 420 may be performed by a device processor of a mobile or resource constrained computing device that is configured with processor-executable instructions to perform the operations of the method. In block 422, the device processor may compare raw data received from one or more device drivers to the UI information received from HLOS. In determination block 424, the device processor may use the comparison results to determine whether the UI event correlates with a user interaction and thus is or is not a fake UI event. In response to determining that the UI event correlates with a user interaction, and thus the UI event is not a fake UI event (i.e., determination block 424="Yes"), the device processor may generate analysis results by applying a behavior vector to a classifier model that includes a decision node that tests a condition related to the user interaction in block 426. In block 428, the device processor may use the analysis results to determine whether a device behavior (e.g., activity of a software application, etc.) is non-benign.

In response to determining that the UI event does not correlate with a user interaction, and thus the UI event is a fake UI event (i.e., determination block 424="No"), the device processor may report the fake UI event to the behavior-based security system in block 430. In block 432, the device processor may generate analysis results by applying a behavior vector to a classifier model that does not include any decision nodes that test conditions related to the user interaction in block 426. In block 428, the use analysis results to determine whether a device behavior (e.g., activity of a software application, etc.) is non-benign.

The various embodiments may also be employed to recognize or at least identify a possibility of a compromised user input sensor device driver. Such capabilities may be useful for recognize when malware has comprised or is inserting a face UI event into the device driver for the user input device or sensor. For example, if the device driver for a touch screen has been compromised, the raw data received from the device driver (e.g., in block 402) may itself be faked, in which case comparing the UI information from the HLOS may not be sufficient to detect this level of attack.

Figure 4C:
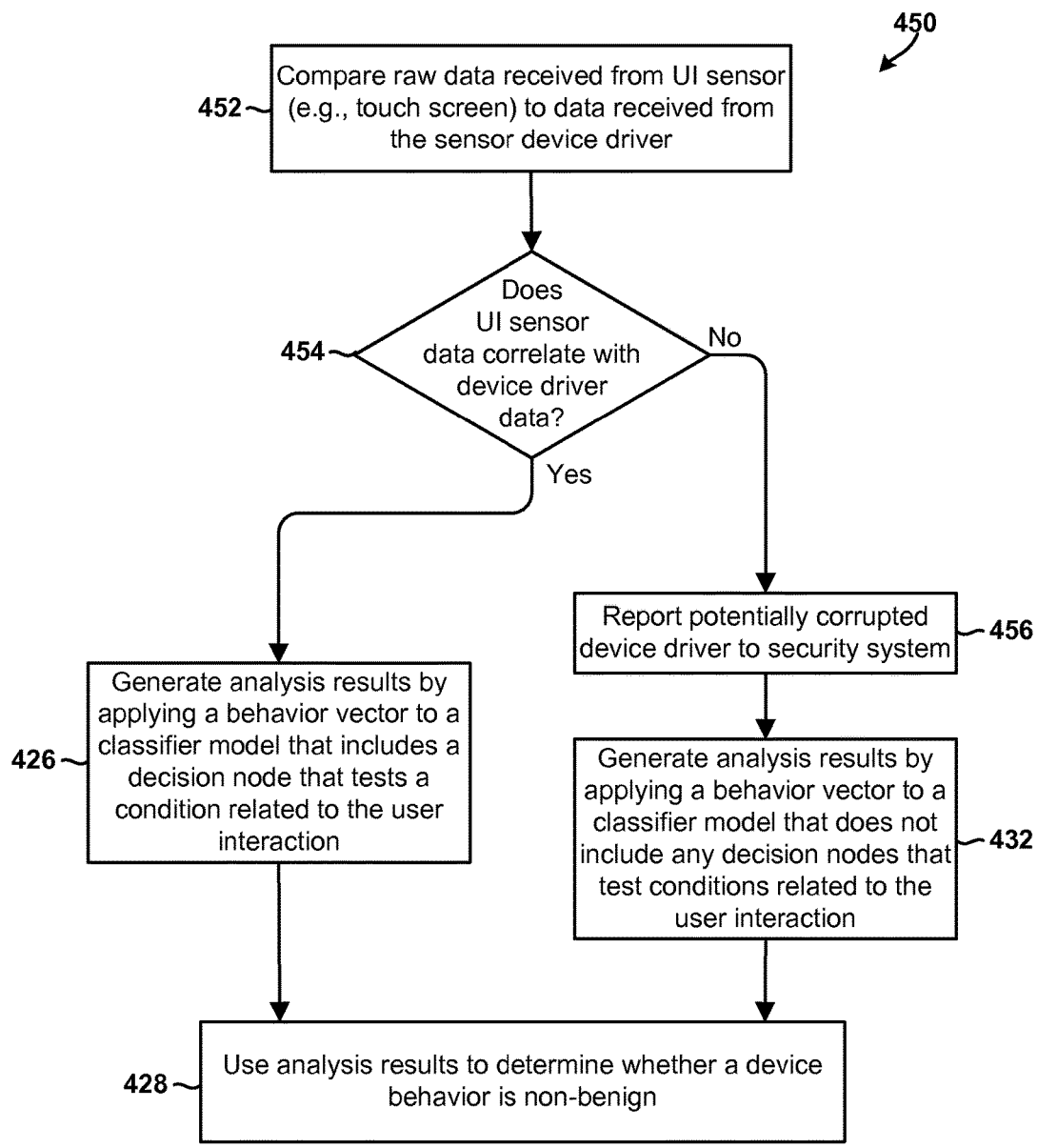
FIG. 4C is a process flow diagram illustrating a method detecting and responding to a compromised user input sensor device driver in accordance with an embodiment.

To address this potential, FIG. 4C illustrates another method 450 for detecting and responding to a compromised user input sensor device driver in accordance with another embodiment. The method 450 may be performed by a device processor of a mobile or resource constrained computing device, and may be performed in addition to or as an alternative to either of the methods 400 and 420 described above. In block 452, the device processor may compare raw data received from one or more user input sensors to data received from the input sensor device drivers. For example, the device processor may receive the raw output data provided by a touch screen and compare that data to data received from the touch screen device driver.

In determination block 454, the device processor may use the comparison results to determine whether the user input sensor data correlates with the corresponding device driver data. This determination may take into account the different format of sensor data and device driver data. For example, the device processor may apply a transformation or analyze the raw sensor data in a manner similar to a device driver in order to determine the device driver output data that should be received based on the raw sensor data, and then compare the received device driver data to the expected data to determine whether there is a match. For example, in determination block 454, the device processor may tap into the stream of output data provided by the touch screen, process the touch screen data stream to determine an appropriate output from the touch screen device driver, and then compare the determined appropriate output with the raw data produced by the touch screen device driver.

In response to determining that the raw UI sensor data correlates with the raw data received from the device driver for that sensor (i.e., determination block 454="Yes"), the device processor may generate analysis results by applying a behavior vector to a classifier model that includes a decision node that tests a condition related to the user interaction in block 426 as described above.

In response to determining that the raw UI sensor data correlates with the raw data received from the device driver for that sensor (i.e., determination block 424="No"), the device processor may report to the behavior-based security system that the device driver is potentially corrupted in block 456. In some embodiments the lack of correlation of raw sensor data to device driver data may be sufficient to determine that a malware or similarly unacceptable condition exists, in which case the report to the behavior-based security system may be sufficient to classify a device behavior (e.g., the activity of the software application) as non-benign. However, in some embodiments the comparison of raw sensor data to device driver data may not be sufficient to definitively determine that the device driver is compromised because data mismatch may be due to problems with the sensor, noise in the connection between the sensor and the device driver, the device driver being of a different version than emulated by the device processor in determination block 454, etc. Thus, in such embodiments the report to the security system may only be that there is a potential that the device driver has been compromised, and further analysis by the behavior-based security system may be necessary (e.g., in blocks 432 and 428) in order to classify the device behavior as benign or non-benign.

In block 432, the device processor may generate analysis results by applying a behavior vector to a classifier model that does not include any decision nodes that test conditions related to the user interaction as described above. This analysis may avoid being fooled by a faked UI event initiated at the device driver level, as well as avoid false positives that could result from malfunctions in or between either of the UI sensor and the sensor's device driver.

In block 428, the device processor may use the analysis results from either blocks 426 or 432 to determine whether a device behavior (e.g., activity of a software application, etc.) is non-benign as described above.

Figure 5:
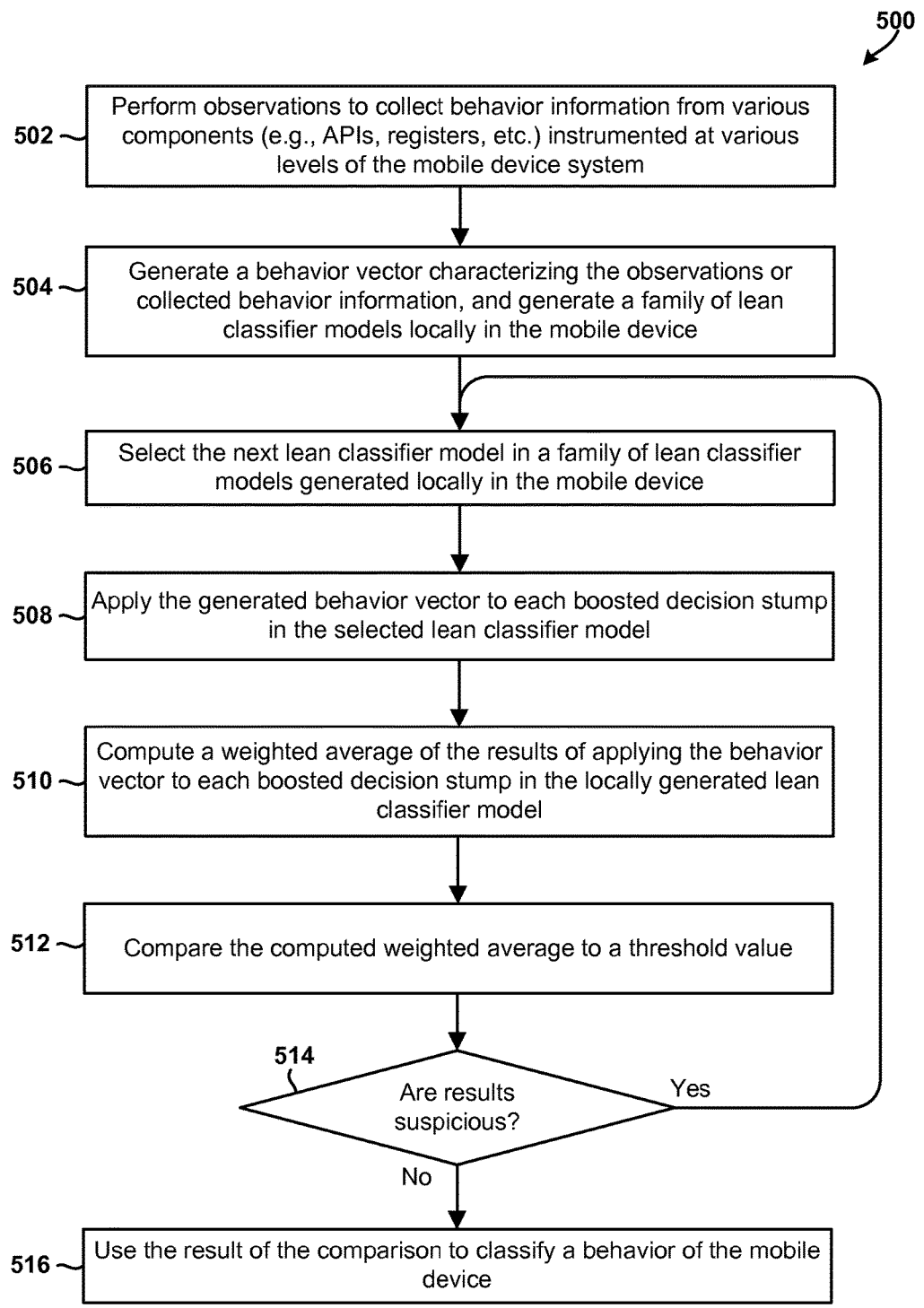
FIG. 5 is a process flow diagram illustrating a method of using a family of classifier models to classify a device behavior in accordance with an embodiment.

FIG. 5 illustrates an embodiment method 500 of using a family of lean classifier model to classify a device behavior in the computing device. Method 500 may be performed by a device processor of a mobile or resource constrained computing device that is configured with processor-executable instructions to perform the operations of the method.

In block 502, the device processor my perform observations to collect behavior information from various components that are instrumented at various levels of the mobile device system. In an embodiment, this may be accomplished via the behavior observer module 302 discussed above with reference to FIG. 3. In block 504, the device processor may generate a behavior vector characterizing the collected behavior information and/or a mobile device behavior. Also in block 504, the device processor may use a full classifier model received from a network server to generate a lean classifier model or a family of lean classifier models of varying levels of complexity (or "leanness"). To accomplish this, the device processor may cull a family of boosted decision stumps included in the full classifier model to generate lean classifier models that include a reduced number of boosted decision stumps and/or evaluate a limited number of test conditions. In an embodiment, one or more of the lean classifier models may be user-specific classifier models.

In block 506, the device processor may select the leanest classifier in the family of lean classifier models (i.e., the model based on the fewest number of different mobile device states, features, behaviors, or conditions) that has not yet been evaluated or applied by the mobile device. In an embodiment, this may be accomplished by the device processor selecting the first classifier model in an ordered list of classifier models. In block 508, the device processor may apply collected behavior information or behavior vectors to each boosted decision stump in the selected lean classifier model. Because boosted decision stumps are binary decisions and the lean classifier model is generated by selecting many binary decisions that are based on the same test condition, the process of applying a behavior vector to the boosted decision stumps in the lean classifier model may be performed in a parallel operation. Alternatively, the behavior vector may be truncated or filtered to just include the limited number of test condition parameters included in the lean classifier model, thereby further reducing the computational effort in applying the model.

In block 510, the device processor may compute or determine a weighted average of the results of applying the collected behavior information to each boosted decision stump in the lean classifier model. In block 512, the device processor may compare the computed weighted average to a threshold value. In determination block 514, the device processor may determine whether the results of this comparison and/or the results generated by applying the selected lean classifier model are suspicious. For example, the device processor may determine whether these results may be used to classify a behavior as either malicious or benign with a high degree of confidence, and if not treat the behavior as suspicious.

If the device processor determines that the results are suspicious (e.g., determination block 514="Yes"), the device processor may repeat the operations in blocks 506-512 to select and apply a stronger (i.e., less lean) classifier model that evaluates more device states, features, behaviors, or conditions until the behavior is classified as malicious or benign with a high degree of confidence. If the device processor determines that the results are not suspicious (e.g., determination block 514="No"), such as by determining that the behavior can be classified as either malicious or benign with a high degree of confidence, in block 516, the device processor may use the result of the comparison generated in block 512 to classify a behavior of the mobile device as benign or potentially malicious.

In an alternative embodiment method, the operations described above may be accomplished by sequentially selecting a boosted decision stump that is not already in the lean classifier model; identifying all other boosted decision stumps that depend upon the same mobile device state, feature, behavior, or condition as the selected decision stump (and thus can be applied based upon one determination result); including in the lean classifier model the selected and all identified other boosted decision stumps that that depend upon the same mobile device state, feature, behavior, or condition; and repeating the process for a number of times equal to the determined number of test conditions. Because all boosted decision stumps that depend on the same test condition as the selected boosted decision stump are added to the lean classifier model each time, limiting the number of times this process is performed will limit the number of test conditions included in the lean classifier model.

Figure 6:
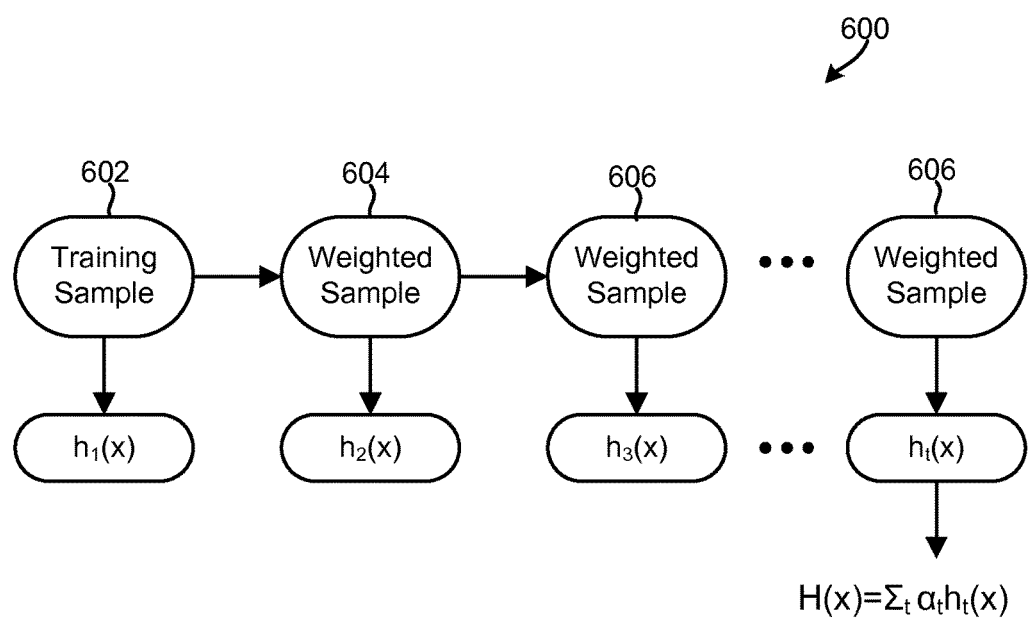
FIG. 6 is an illustration of example decision nodes that may be generated and used to generate classifier models.

FIG. 6 illustrates an example method 600 suitable for generating a decision tree/classifier that is suitable for use in accordance with various embodiments. Method 600 may be performed by a device processor of a mobile or resource constrained computing device that is configured with processor-executable instructions to perform the operations of the method. In block 602, the device processor may generate and/or execute a decision tree/classifier, collect a training sample from the execution of the decision tree/classifier, and generate a new classifier model (h1(x)) based on the training sample. The training sample may include information collected from previous observations or analysis of mobile device behaviors, software applications, or processes in the mobile device. The training sample and/or new classifier model (h1(x)) may be generated based the types of question or test conditions included in previous classifiers and/or based on accuracy or performance characteristics collected from the execution/application of previous data/behavior models or classifiers.

In block 604, the device processor may boost (or increase) the weight of the entries that were misclassified by the generated decision tree/classifier (h1(x)) to generate a second new tree/classifier (h2(x)). In an embodiment, the training sample and/or new classifier model (h2(x)) may be generated based on the mistake rate of a previous execution or use (h1(x)) of a classifier. In an embodiment, the training sample and/or new classifier model (h2(x)) may be generated based on attributes determined to have that contributed to the mistake rate or the misclassification of data points in the previous execution or use of a classifier.

In an embodiment, the misclassified entries may be weighted based on their relatively accuracy or effectiveness. In operation 606, the processor may boost (or increase) the weight of the entries that were misclassified by the generated second tree/classifier (h2(x)) to generate a third new tree/classifier (h3(x)). In operation 608, the operations of 604-606 may be repeated to generate "t" number of new tree/classifiers ($h_t(x)$).

By boosting or increasing the weight of the entries that were misclassified by the first decision tree/classifier (h1(x)), the second tree/classifier (h2(x)) may more accurately classify the entities that were misclassified by the first decision tree/classifier (h1(x)), but may also misclassify some of the entities that where correctly classified by the first decision tree/classifier (h1(x)). Similarly, the third tree/classifier (h3(x)) may more accurately classify the entities that were misclassified by the second decision tree/classifier (h2(x)) and misclassify some of the entities that where correctly classified by the second decision tree/classifier (h2(x)). That is, generating the family of tree/classifiers h1(x)-$h_t(x)$ may not result in a system that converges as a whole, but results in a number of decision trees/classifiers that may be executed in parallel.

Figure 7:
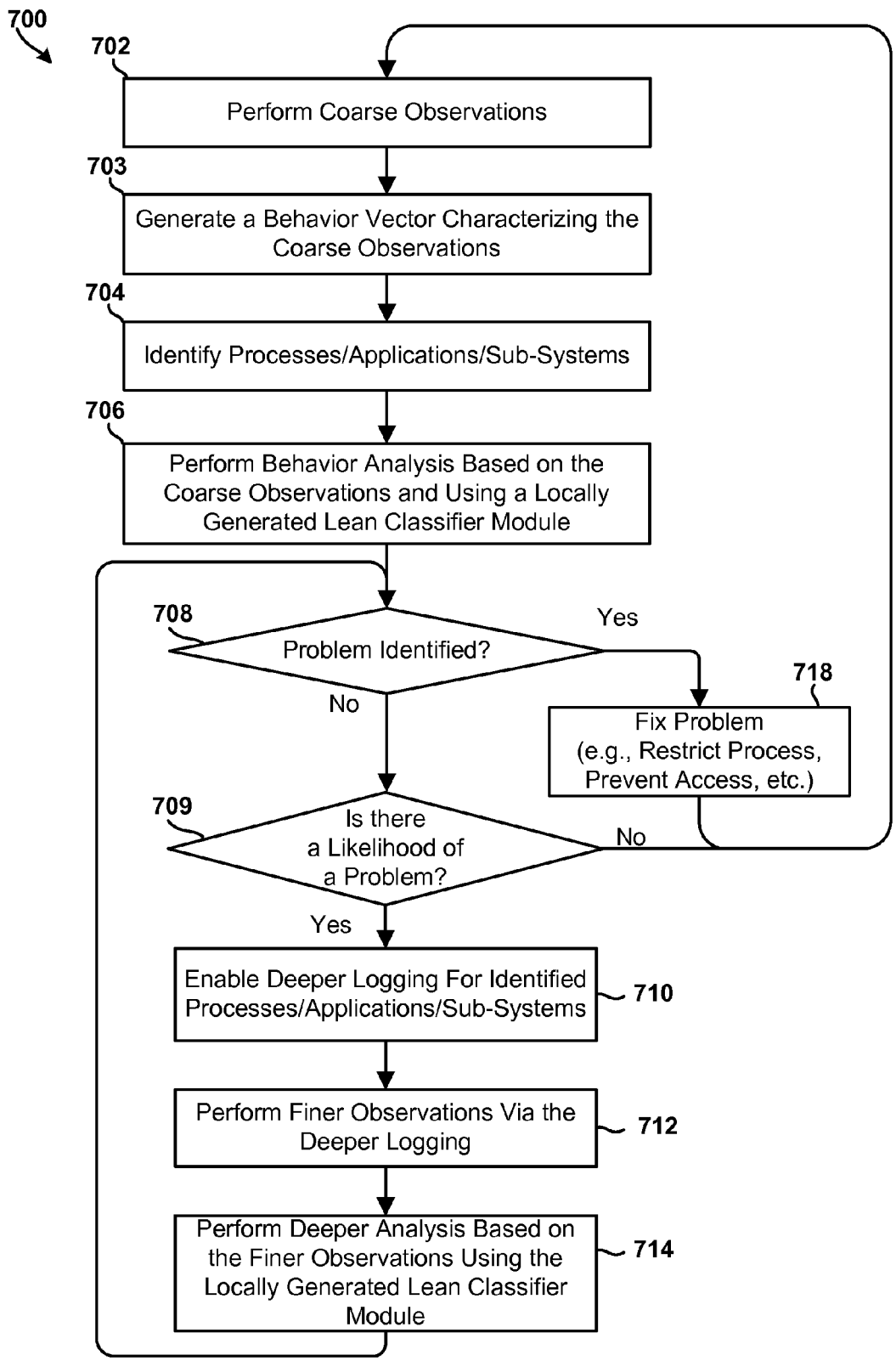
FIG. 7 is a process flow diagram illustrating a method of performing adaptive observations in accordance with an embodiment.

FIG. 7 illustrates an example method 700 for performing dynamic and adaptive observations in accordance with an embodiment. Method 700 may be performed by a device processor of a mobile or resource constrained computing device that is configured with processor-executable instructions to perform the operations of the method. In block 702, the device processor may perform coarse observations by monitoring/observing a subset of a large number of factors, behaviors, and activities that could contribute to the mobile device's degradation. In block 703, the device processor may generate a behavior vector characterizing the coarse observations and/or the mobile device behavior based on the coarse observations. In block 704, the device processor may identify subsystems, processes, and/or applications associated with the coarse observations that may potentially contribute to the mobile device's degradation. This may be achieved, for example, by comparing information received from multiple sources with contextual information received from sensors of the mobile device. In block 706, the device processor may perform behavioral analysis operations based on the coarse observations.

In determination block 708, the device processor may determine whether suspicious behaviors or potential problems can be identified and corrected based on the results of the behavioral analysis. When the device processor determines that the suspicious behaviors or potential problems can be identified and corrected based on the results of the behavioral analysis (i.e., determination block 708="Yes"), in block 718, the processor may initiate a process to correct the behavior and return to block 702 to perform additional coarse observations.

When the device processor determines that the suspicious behaviors or potential problems cannot be identified and/or corrected based on the results of the behavioral analysis (i.e., determination block 708="No"), in determination block 709 the device processor may determine whether there is a likelihood of a problem. In an embodiment, the device processor may determine that there is a likelihood of a problem by computing a probability of the mobile device encountering potential problems and/or engaging in suspicious behaviors, and determining whether the computed probability is greater than a predetermined threshold. When the device processor determines that the computed probability is not greater than the predetermined threshold and/or there is not a likelihood that suspicious behaviors or potential problems exist and/or are detectable (i.e., determination block 709="No"), the processor may return to block 702 to perform additional coarse observations.

When the device processor determines that there is a likelihood that suspicious behaviors or potential problems exist and/or are detectable (i.e., determination block 709="Yes"), in block 710, the device processor may perform deeper logging/observations or final logging on the identified subsystems, processes or applications. In block 712, the device processor may perform deeper and more detailed observations on the identified subsystems, processes or applications. In block 714, the device processor may perform further and/or deeper behavioral analysis based on the deeper and more detailed observations. In determination block 708, the device processor may again determine whether the suspicious behaviors or potential problems can be identified and corrected based on the results of the deeper behavioral analysis. When the device processor determines that the suspicious behaviors or potential problems cannot be identified and corrected based on the results of the deeper behavioral analysis (i.e., determination block 708="No"), the processor may repeat the operations in blocks 710-714 until the level of detail is fine enough to identify the problem or until it is determined that the problem cannot be identified with additional detail or that no problem exists.

When the device processor determines that the suspicious behaviors or potential problems can be identified and corrected based on the results of the deeper behavioral analysis (i.e., determination block 708="Yes"), in block 718, the device processor may perform operations to correct the problem/behavior, and the processor may return to block 702 to perform additional operations.

In an embodiment, as part of blocks 702-718 of method 700, the device processor may perform real-time behavior analysis of the system's behaviors to identify suspicious behaviors from limited and coarse observations, to dynamically determine the behaviors to observe in greater detail, and to dynamically determine the precise level of detail required for the observations. This enables the device processor to efficiently identify and prevent problems from occurring, without requiring the use of a large amount of processor, memory, or battery resources on the device.

The various embodiments improve upon existing solutions by using behavior analysis and/or machine learning techniques (as opposed to a permissions, policy, or rules-based approaches) to monitor and analyze the collective behavior of a select group of software applications. The use of behavior analysis or machine learning techniques is important because modern computing devices are highly configurable and complex systems, and the factors that are most important for determining whether software applications are colluding may be different in each device. Further, different combinations of device features/factors may require an analysis in each device in order for that device to determine whether software applications are colluding. Yet, the precise combination of features/factors that require monitoring and analysis often can only be determined using information obtained from the specific computing device in which the activity or activities is/are performed and at the time the activity/activities is/are underway. For these and other reasons, existing solutions are not adequate for monitoring, detecting, and characterizing the collective behavior of, or the relationships between, a plurality of software applications in the computing device, in real-time, while the behavior is underway, and without consuming a significant amount of the computing device's processing, memory, or power resources.

Figure 8:
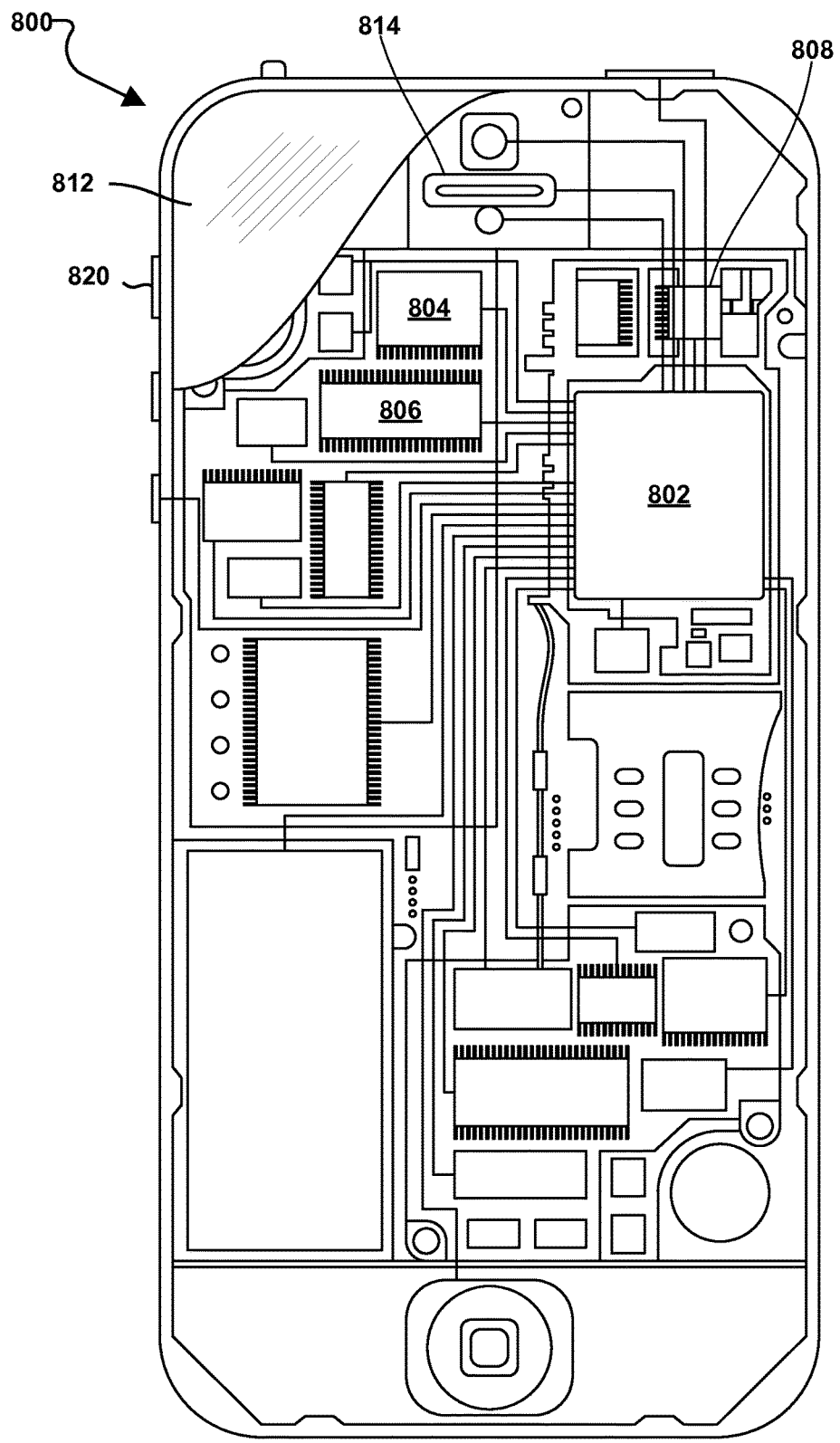
FIG. 8 is a component block diagram of a mobile device suitable for use in an embodiment.

The various embodiments, including the embodiment discussed above with reference to FIGS. 2-7, may be implemented on a variety of computing devices configured with processor-executable instruction, an example of which is illustrated in FIG. 8 in the form of a smartphone. A smartphone 800 may include a processor 802 coupled to internal memory 804, a display 812, and to a speaker 814. Additionally, the smartphone 800 may include an antenna for sending and receiving electromagnetic radiation that may be connected to a wireless data link and/or cellular telephone transceiver 808 coupled to the processor 802. Smartphones 800 typically also include menu selection buttons or rocker switches 820 for receiving user inputs.

A typical smartphone 800 also includes a sound encoding/decoding (CODEC) circuit 806, which digitizes sound received from a microphone into data packets suitable for wireless transmission and decodes received sound data packets to generate analog signals that are provided to the speaker to generate sound. Also, one or more of the processor 802, wireless transceiver 808 and CODEC 806 may include a digital signal processor (DSP) circuit (not shown separately).

The processor 802 may be any programmable microprocessor, microcomputer or multiple processor chip or chips that can be configured by processor-executable instructions (applications) to perform a variety of functions and operations, including the operations of the various embodiments described below. In some mobile devices, multiple processors 802 may be provided, such as one processor dedicated to wireless communication functions and one processor dedicated to running other applications. Typically, software applications may be stored in the internal memory 804 before they are accessed and loaded into the processor 802. The processor 802 may include internal memory sufficient to store the application software instructions. In various embodiments, the processor 802 may be a device processor, processing core, or an SOC (such as the example SOC 100 illustrated in FIG. 1). In an embodiment, the smartphone 800 may include an SOC, and the processor 802 may be one of the processors included in the SOC (such as one of the processors 102, 104, 106, 108, 110 illustrated in FIG. 1).

Various embodiments may further include a computing device that includes means for comparing raw data received from a user input device to user interaction event information to generate analysis results, and means for using the generated analysis results to determine whether a user interaction (UI) event correlates with a user of the computing device. In some embodiments, the means for comparing raw data received from the user input device to the user interaction event information to generate the analysis results may include means for comparing raw data received from a device driver to interaction information received from a high level operating system. In some embodiments, the computing device may further include means for classifying an activity of a software application as non-benign in response to determining that the UI event does not correlate with a user of the computing device. In some embodiments, the computing device may further include means for generating a behavior vector that characterizes an activity of a software application, means for applying the generated behavior vector to a classifier model that includes a decision node that evaluates whether there is a UI event that corresponds to the activity in response to determining that the UI event does not correlate with a user of the computing device, and means for using a result of applying the generated behavior vector to the classifier model to determine whether the activity of the software application is non-benign. In some embodiments, the computing device may further include means for generating a behavior vector that characterizes an activity of a software application, means for selecting a classifier model that does not include a decision node that tests whether there is a UI event that corresponds to the activity in response to determining that the UI event does not correlate with a user of the computing device, means for applying the generated behavior vector to the selected classifier model to generate additional analysis results, and means for using the generated additional analysis results to determine whether the activity of the software application is non-benign. In some embodiments, the computing device may further include means for selecting a family of robust classifier models in response to determining that the UI event does not correlate with a user of the computing device, and means for applying a plurality of behavior vectors to the selected family of robust classifier models to determine whether an activity of a software application is non-benign.

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The operations of a method or algorithm disclosed herein may be embodied in a processor-executable software module which may be in the form of stored processor-executable software instruction store on a non-transitory computer-readable storage medium or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of analyzing an activity of a software application operating on a computing device, comprising:
monitoring, via a processor of the computing device, the activity of the software application operating on the computing device to collect behavior information;
determining whether the monitored activity should be associated with a user interaction (UI) based on the collected behavior information;
determining whether a detected UI event corresponds to the monitored activity in response to determining that the monitored activity should be associated with the user interaction;
collecting raw data from a sensor of the computing device in response to determining that the detected UI event corresponds to the monitored activity;
generating analysis results by analyzing the collected raw data in conjunction with UI event information associated with the detected UI event, in response to determining that the detected UI event corresponds to the monitored activity;

determining, based on the generated analysis results, whether the detected UI event correlates with a user of the computing device;

classifying the detected UI event as an authentic UI event in response to determining, based on the generated analysis results, that the detected UI event correlates with the user of the computing device;

classifying the detected UI event as a fake UI event in response to determining, based on the generated analysis results, that the detected UI event does not correlate with the user of the computing device; and determining whether the monitored activity is non-benign based on the classification of the detected UI event.

2. The method of claim 1, further comprising receiving the UI event information associated with the detected UI event from a high level operating system (HLOS) of the computing device.

3. The method of claim 1, wherein determining whether the monitored activity is non-benign based on the classification of the detected UI event comprises:

classifying the monitored activity as non-benign in response to determining that the detected UI event is classified as the fake UI event.

4. The method of claim 1, further comprising:

generating a behavior vector that characterizes the monitored activity;

applying the behavior vector to a classifier model that includes a decision node that evaluates whether there is a user interaction event that corresponds to the monitored activity; and determining, based on a result of applying the behavior vector to the classifier model, whether the monitored activity is non-benign.

5. The method of claim 1, further comprising:

generating a behavior vector that characterizes the monitored activity;

selecting a classifier model that does not include a decision node that tests whether there is a user interaction event that corresponds to the monitored activity;

applying the behavior vector to the selected classifier model to generate additional analysis results; and determining, based on the additional analysis results, whether the monitored activity is non-benign.

6. The method of claim 1, further comprising:

selecting a family of robust classifier models;

applying a plurality of behavior vectors to one or more classifier models in the selected family of robust classifier models to generate additional analysis results; and determining whether the monitored activity is non-benign based on the generated additional analysis results.

7. The method of claim 1, further comprising:

comparing raw data received from a first sensor of the computing device to raw data received from a second sensor of the computing device to determine whether the raw data received from the first sensor is consistent with the raw data received from the second sensor.

8. The method of claim 7, wherein comparing the raw data received from the first sensor of the computing device to the raw data received from the second sensor of the computing device to determine whether the raw data received from the first sensor is consistent with the raw data received from the second sensor comprises comparing results of applying behavior vectors to classifier models to determine whether the raw data received from the first sensor is consistent with the raw data received from the second sensor.

9. The method of claim 1, wherein collecting the raw data from the sensor of the computing device comprises collecting the raw data from a user input sensor, the method further comprising receiving the UI event information from a driver for the user input sensor.

10. The method of claim 1, further comprising:

generating a behavior vector that characterizes the monitored activity;

applying the behavior vector to a classifier model that does not include a decision node that evaluates conditions related to user interactions with the computing device; and determining, based on a result of applying the behavior vector to the classifier model, whether the monitored activity is non-benign.

11. A computing device, comprising:

means for monitoring an activity of a software application operating on the computing device to collect behavior information;

means for determining whether the monitored activity should be associated with a user interaction (UI) based on the collected behavior information;

means for determining whether a detected UI event corresponds to the monitored activity in response to determining that the monitored activity should be associated with the user interaction;

means for collecting raw data from a sensor of the computing device in response to determining that the detected UI event corresponds to the monitored activity;

means for generating analysis results by analyzing the collected raw data in conjunction with UI event information associated with the detected UI event in response to determining that the detected UI event corresponds to the monitored activity;

means for determining, based on the generated analysis results, whether the detected UI event correlates with a user of the computing device;

means for classifying the detected UI event as an authentic UI event in response to determining, based on the generated analysis results, that the detected UI event correlates with the user of the computing device;

means for classifying the detected UI event as a fake UI event in response to determining, based on the generated analysis results, that the detected UI event does not correlate with the user of the computing device; and means for determining whether the monitored activity is non-benign based on the classification of the detected UI event.

12. The computing device of claim 11, further comprising means for receiving the UI event information associated with the detected UI event from a high level operating system (HLOS) of the computing device.

13. The computing device of claim 11, wherein means for determining whether the monitored activity is non-benign based on the classification of the detected UI event further comprises means for classifying the monitored activity as non-benign in response to determining that the detected UI event is classified as the fake UI event.

14. The computing device of claim 11, further comprising:

means for generating a behavior vector that characterizes the monitored activity;

means for applying the behavior vector to a classifier model that includes a decision node that evaluates whether there is a user interaction event that corresponds to the monitored activity; and means for determining, based on a result of applying the behavior vector to the classifier model, whether the monitored activity is non-benign.

15. The computing device of claim 11, further comprising:

means for generating a behavior vector that characterizes the monitored activity;

means for selecting a classifier model that does not include a decision node that tests whether there is a user interaction event that corresponds to the monitored activity;

means for applying the behavior vector to the selected classifier model to generate additional analysis results; and means for determining, based on the additional analysis results, whether the monitored activity is non-benign.

16. The computing device of claim 11, further comprising:

means for selecting a family of robust classifier models; and means for applying a plurality of behavior vectors to one or more classifier models in the selected family of robust classifier models to generate additional analysis results; and means for determining whether the monitored activity is non-benign based on the generated additional analysis results.

17. A computing device, comprising:

a processor configured with processor-executable instructions to:

monitor an activity of a software application operating on the computing device to collect behavior information;

determine whether the monitored activity should be associated with a user interaction (UI) based on the collected behavior information;

determine whether a detected UI event corresponds to the monitored activity in response to determining that the monitored activity should be associated with the user interaction;

collect raw data from a sensor of the computing device in response to determining that the detected UI event corresponds to the monitored activity;

generate analysis results by analyzing the collected raw data in conjunction with UI event information associated with the detected UI event in response to determining that the detected UI event corresponds to the monitored activity;

determine, based on the generated analysis results, whether the detected UI event correlates with a user of the computing device;

classify the detected UI event as an authentic UI event in response to determining, based on the generated analysis results, that the detected UI event correlates with the user of the computing device;

classify the detected UI event as a fake UI event in response to determining, based on the generated analysis results, that the detected UI event does not correlate with the user of the computing device; and determine whether an monitored activity is non-benign based on the classification of the detected UI event.

18. The computing device of claim 17, wherein the processor is configured with processor-executable instructions to receive the UI event information by receiving the UI event information from a high level operating system.

19. The computing device of claim 17, wherein the processor is configured with processor-executable instructions classify the monitored activity as non-benign in response to determining that the detected UI event is classified as the fake UI event.

20. The computing device of claim 17, wherein the processor is configured with processor-executable instructions to:

generate a behavior vector that characterizes the monitored activity;

apply the behavior vector to a classifier model that includes a decision node that evaluates whether there is a user interaction event that corresponds to the monitored activity; and determine, based on a result of applying the behavior vector to the classifier model, whether the monitored activity is non-benign.

21. The computing device of claim 17, wherein the processor is configured with processor-executable instructions to:

generate a behavior vector that characterizes the monitored activity;

select a classifier model that does not include a decision node that tests whether there is a user interaction event that corresponds to the monitored activity;

apply the behavior vector to the selected classifier model to generate additional analysis results; and determine, based on the additional analysis results, whether the monitored activity is non-benign.

22. The computing device of claim 17, wherein the processor is configured with processor-executable instructions to:

select a family of robust classifier models;

apply a plurality of behavior vectors to one or more classifier models in the selected family of robust classifier models to generate additional analysis results; and determine whether the monitored activity is non-benign based on the generated additional analysis results.

23. A non-transitory computer-readable storage medium having stored thereon processor-executable instructions configured to cause a processor of a computing device to perform operations comprising:

monitoring an activity of a software application operating on the computing device to collect behavior information;

determining whether the monitored activity should be associated with a user interaction (UI) based on the collected behavior information;

determining whether a detected UI event corresponds to the monitored activity in response to determining that the monitored activity should be associated with the user interaction;

collecting raw data from a sensor of the computing device in response to determining that the detected UI event corresponds to the monitored activity;

generating analysis results by analyzing the collected raw data in conjunction with UI event information associated with the detected UI event in response to determining that the detected UI event corresponds to the monitored activity;

determining, based on the generated analysis results, whether the detected UI event correlates with a user of the computing device;

classifying the detected UI event as an authentic UI event in response to determining, based on the generated analysis results, that the detected UI event correlates with the user of the computing device;

classifying the detected UI event as a fake UI event in response to determining, based on the generated analysis results, that the detected UI event does not correlate with the user of the computing device; and determining whether an monitored activity is non-benign based on the classification of the detected UI event.

24. The non-transitory computer-readable storage medium of claim 23, wherein the stored processor-executable instructions are configured to cause a processor to perform operations further comprising receiving the UI event information associated with the detected UI event from a high level operating system (HLOS) of the computing device.

25. The non-transitory computer-readable storage medium of claim 23, wherein the stored processor-executable instructions are configured to cause a processor to perform operations such that determining whether the monitored activity is non-benign based on the classification of the detected UI event comprises classifying the monitored activity as non-benign in response to determining that the detected UI event is classified as the fake UI event.

26. The non-transitory computer-readable storage medium of claim 23, wherein the stored processor-executable instructions are configured to cause a processor to perform operations further comprising:

generating a behavior vector that characterizes the monitored activity;

applying the behavior vector to a classifier model that includes a decision node that evaluates whether there is a user interaction event that corresponds to the monitored activity; and determining, based on a result of applying the behavior vector to the classifier model, whether the monitored activity is non-benign.

27. The non-transitory computer-readable storage medium of claim 23, wherein the stored processor-executable instructions are configured to cause a processor to perform operations further comprising:

generating a behavior vector that characterizes the monitored activity;

selecting a classifier model that does not include a decision node that tests whether there is a user interaction event that corresponds to the monitored activity;

applying the behavior vector to the selected classifier model to generate additional analysis results; and determining, based on the additional analysis results, whether the monitored activity is non-benign.

28. The non-transitory computer-readable storage medium of claim 23, wherein the stored processor-executable instructions are configured to cause a processor to perform operations further comprising:

selecting a family of robust classifier models;

applying a plurality of behavior vectors to one or more classifier models in the selected family of robust classifier models to generate additional analysis results; and determining whether the monitored activity is non-benign based on the generated additional analysis results.

* * * * *